(12) United States Patent
Kadono

(10) Patent No.: US 6,813,388 B2
(45) Date of Patent: Nov. 2, 2004

(54) IMAGE CODING METHOD, IMAGE CODING APPARATUS AND DATA STORAGE MEDIUM

(75) Inventor: Shinya Kadono, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 687 days.

(21) Appl. No.: 09/777,667

(22) Filed: Feb. 7, 2001

(65) Prior Publication Data

US 2001/0014177 A1 Aug. 16, 2001

(30) Foreign Application Priority Data

Feb. 7, 2000 (JP) ........................................ 2000-029373

(51) Int. Cl.[7] ................................................. G06K 9/36
(52) U.S. Cl. ...................... 382/243; 382/232; 382/240; 382/236
(58) Field of Search ............................... 382/232, 243, 382/236, 250, 284

(56) References Cited

U.S. PATENT DOCUMENTS 5,892,849 A * 4/1999 Chun et al. ................. 382/236
6,314,209 B1 * 11/2001 Kweon et al. .............. 382/243

FOREIGN PATENT DOCUMENTS

JP 411055665 A * 2/1999 ............ H04N/7/24

OTHER PUBLICATIONS

Eryurtlu et al., "Very Low Bit Rate Segmentation Based Video Coding Using Contour and Texture Prediction", IEEE vol. 142, No. 5, Oct. 1995, pps. 253–261.*
Touradj Ebrahimi et al., "MPEG–4 Natural Video Coding– An Overview", Nov. 2000, 1–28.

* cited by examiner

*Primary Examiner*—Anh Hong Do
(74) *Attorney, Agent, or Firm*—Wenderoth, Lind & Ponack, L.L.P.

(57) ABSTRACT

A coding process is enabled in object units for an image signal having no shape information, without performing a process for extracting shape information of a specific area in a natural image from the image signal having no shape information corresponding to an image, such as the natural image. The image coding apparatus has a shape value data memory which contains shape values independent of pixel values constituting an image signal having no shape information. The coding of the pixel value is performed on the basis of the shape value read from the shape value data memory, as well as the coding of the shape value being performed, and then pixel coded data and shape coded data are multiplexed and output.

18 Claims, 26 Drawing Sheets

Fig.19 (a)
pixel VOP 
shape VOP 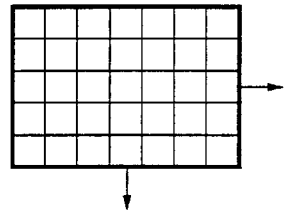
shape VOP after scaling to pixel VOP 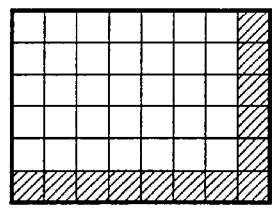
Fig.19 (b)
pixel VOP 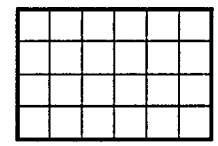
shape VOP 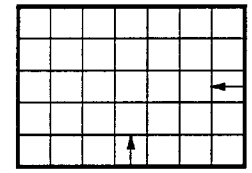
shape VOP after scaling to pixel VOP 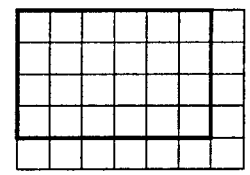
Fig.20
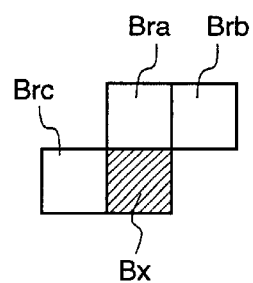

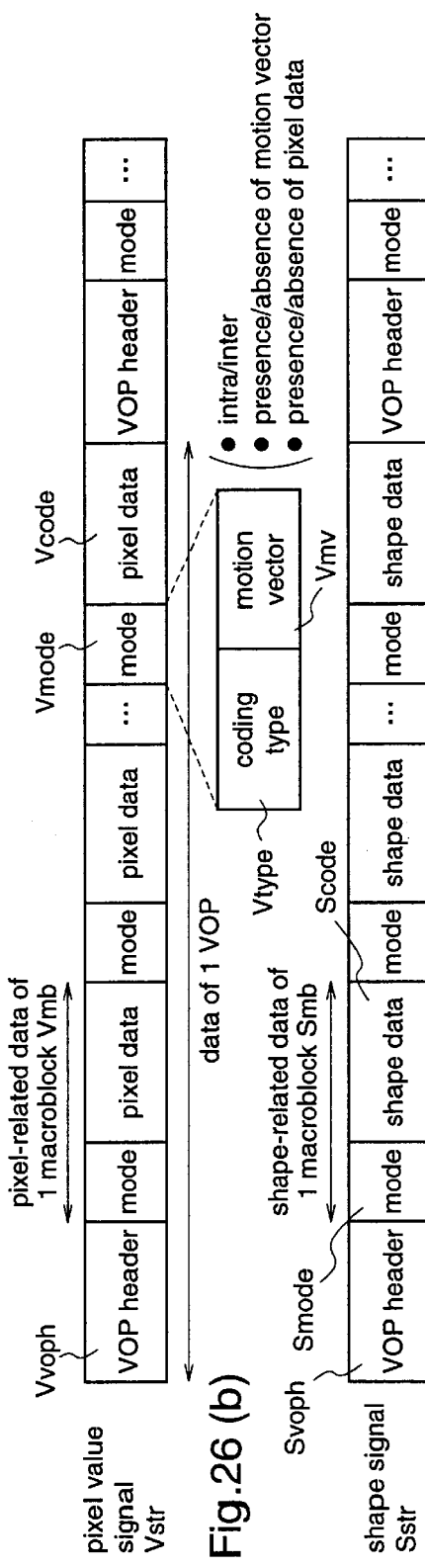
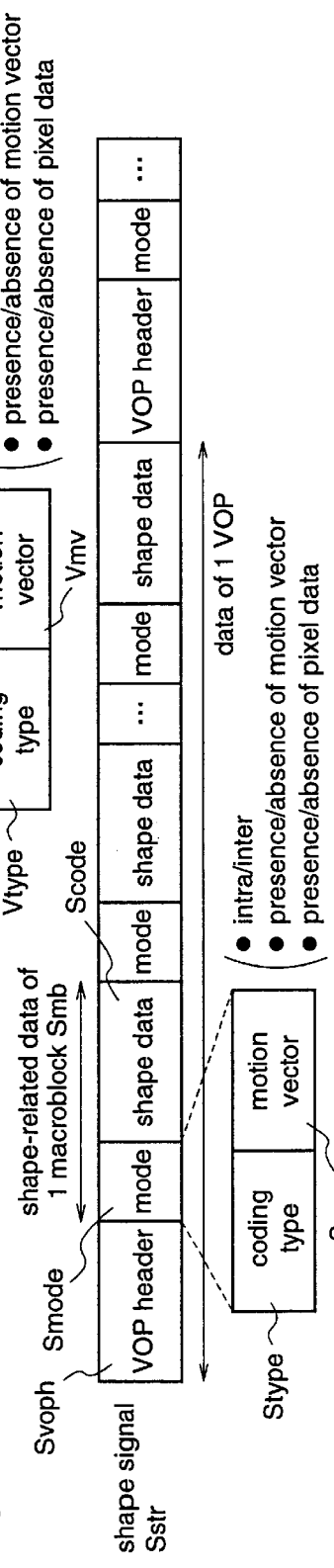
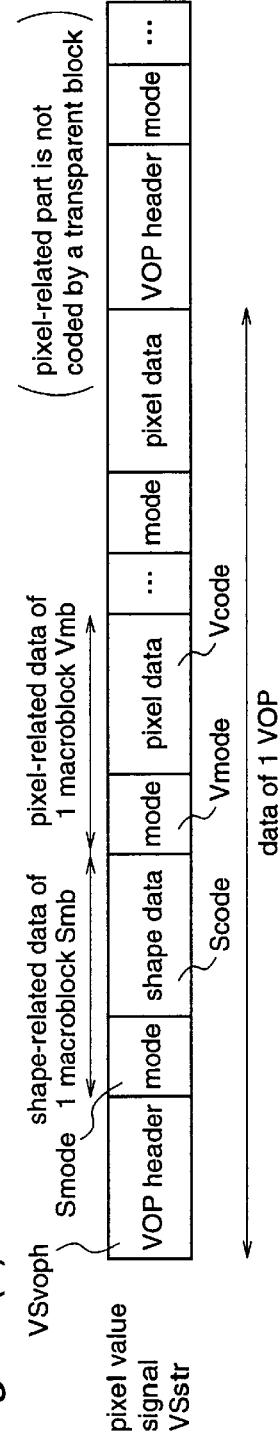
Fig.26 (a), Fig.26 (b), Fig.26 (c)

IMAGE CODING METHOD, IMAGE CODING APPARATUS AND DATA STORAGE MEDIUM

FIELD OF THE INVENTION

This invention relates to an image coding method, image coding apparatus and data storage medium and, more particularly, to an image coding method and image coding apparatus which perform coding of an image signal having no shape value in combination with coding of a shape value independent of a pixel value, and generate a multiplex coded signal including shape value information and pixel value information, and a data storage medium which contains a program for implementing the coding process according to the image coding method by software.

BACKGROUND OF THE INVENTION

In recent years, we have greeted the age of multimedia in which audio, video and other data are integrally handled, and the conventional information media (i.e., means for transmitting information to men), such as newspapers, magazines, televisions, radios, and telephones, have been adopted as the subjects of multimedia. Generally, "multimedia" means to represent, not only characters, but also diagrams, speeches, and especially images in relation with each other. In order to handle the conventional information media as the subjects of multimedia, it is necessary to transform the information into a digital format.

When the quantity of data possessed by each information medium described above is estimated as the quantity of digital data, in the case of characters, the data quantity for each character is 1~2 bytes. However, in the case of speech, the data quantity is 64 kbits per second (quality for telecommunication) and, in the case of moving picture, it is more than 100 Mbits per second (quality for current television broadcasting). So, as for most of the information media described above, it is not practical to handle such massive data as it is in the digital format. For example, although visual telephones have already been put to practical use by ISDN (Integrated Services Digital Network) having a transmission rate of 64 kbps~1.5 Mbps, it is impossible to transmit an image of a television camera as it is by the ISDN.

So, data compression technologies are demanded. In the case of visual telephones, the moving picture compression technologies standardized as H.261 and H.263 by ITU-T (International Telecommunication Union-Telecommunication Sector) are employed. Further, according to the data compression technology based on MPEG1, it is possible to record image data, together with audio data, in an ordinary music CD (compact disk).

MPEG (Moving Picture Experts Group) is an international standard of data compression for data of a moving picture (an image signal of a moving picture). In MPEG1, data of a moving picture is compressed to 1.5 Mbps, i.e., data of a television signal is compressed to about 1/100. Since the transmission rate to which MPEG1 is directed is limited to mainly about 1.5 Mbps, MPEG2 is standardized to meet the demand for higher image quality. In MPEG2, data of a moving picture is compressed to 2~15 Mbps.

Under the existing circumstances, standardization of MPEG4 is now proceeded by the working group for standardization of MPEG1 and MPEG2 (ISO/IEC JTC1/SC29/WG11). MPEG4 enables coding and signal processing. in object units, and thereby realizes new functions required in the age of multimedia.

MPEG4 is characterized in that the coding of image signals is performed in object units. In MPEG4, the image signals are not coded in units of frame as an image space having a rectangular shape as in MPEG1 and MPEG2, but the coding of the image signals is performed in object units. To be specific, a shape value which indicates the shape of an object and a pixel value which indicates the design of the object are coded as the image signal.

When the shape value of the object is coded in this way, the new function that the users can freely compose images corresponding to coded image signals and display the images can be realized, as in image composition process in the computer graphics. For the pixel value of a pixel located outside of the object. (outside-object pixel value) which does not require the coding, the coding process can be omitted and thereby the compression rate for the image signal can be improved.

FIG. 24 is a schematic diagram for explaining an image signal including shape information.

The image signal including the shape information includes two signal values, i.e., a pixel value which represents the design of an object to be displayed and a shape value which represents the shape of the object to be displayed. For example, as shown in FIG. 24, an image signal including shape information of a moving picture includes pixel values which form each of pixel VOPs (Fv1~Fv5) and shape values which form each of shape VOPs (Fs1~Fs5). Here, the pixel VOPs (Fv1~Fv5) and their corresponding shape VOPs (Fs1~Fs5) are displayed at display times t1~t5, respectively, as shown in FIG. 24.

When a natural image is taken by a camera, an image signal obtained by picture-taking by the camera as the camera output includes only a pixel value out of the two signal values (shape value and pixel value). Thus, in the prior art image coding process, the process for generating a shape value indicating the shape of a specific area (object) in the natural image is performed on the basis of the pixel value included in the image signal, with using the image processing technology for subjecting the frame of the natural image to a processing such as area separation, area segmentation and area extraction.

FIG. 25 is a block diagram illustrating a structure of a prior art image coding apparatus which performs the image coding process, using the shape value according to MEG4.

In MEPG4, the concept equivalent to a frame which constitutes video-of natural images or the like, i.e., the frame which constitutes video of a specific area (object) and which is updated with the passage of time is defined as VOP (video object plane). Further, the coding in MPEG4 is performed in block units and macroblock units as in MPEG1 and MPEG2. Here, the macroblocks are image areas which are obtained by dividing the VOP. Each of the image areas is composed of 16 pixels×16 pixels. The blocks are image areas which constitute the macroblock. Each of the image areas is composed of 8 pixels×pixels.

This image coding apparatus 200 has an IP decision unit 1 for deciding whether a target VOP for which various parameters are set and which is to be coded on the basis of these parameters is assumed to be a VOP subjected to intra-frame coding (I-VOP) or a VOP subjected to inter-frame coding (P-VOP), and outputting a coding mode signal IPmode indicating which type of the coding is to be performed to the target VOP, and a shape extractor 2 for extracting a shape value Spel indicating the shape of the specific area on the basis of the pixel value Vpel associated with the specific area.

This image coding apparatus 200 further has a transparency judgement unit 3 for judging whether the target block in the target VOP to be subjected to the coding requires the coding or not on the basis of the shape value Spel, and outputting the result of the judgement as block transparency information Dtran of the target block, a shape encoder 4 for coding the shape value Sple on the basis of the block transparency information Dtran and the coding mode signal IPmode, and a pixel encoder 5 for coding the pixel value Vpel on the basis of the block transparency information Dtran, the coding mode signal IPmode, and the shape value Spel.

The transparency judgement unit 3 judges whether the pixels in the target block are all outside-shape pixels located outside of the specific area and the target block does not require coding, or at least part of the pixels in the target block are inside-shape pixels located inside of the specific area and the target block requires coding, and outputs the block transparency information Dtran corresponding to the result of the judgement. The shape encoder 4 has a structure which outputs a code for indicating that the target block is an outside-object block when the block transparency information Dtran indicates this, and outputs a shape coded data Sstr obtained by the coding of the shape value Spel when the block transparency information Dtran indicates that the target block is not an outside-object block. Further, the pixel encoder 5 has a structure which does not perform the coding of the pixel value Vpel when the block transparency information Dtran indicates that the target block is an outside-object block, and outputs pixel coded data Vstr obtained by the coding of the pixel value Vpel when the block transparency information Dtran indicates that the target block is not an outside-object block.

Further, the image coding apparatus 200 has a multiplexer 6 for multiplexing the shape coded data Sstr and the pixel coded data Vstr and outputting a multiplex coded signal Vstr.

Next, the operation of the image coding apparatus 200 will be described.

In the image coding apparatus 200, when an image signal having no shape information is successively input for each frame, the IP decision unit 1 decides whether the target VOP to be coded is assumed to be a VOP subjected to intra-frame coding. (I-VOP) or an VOP subjected to inter-frame coded (P-VOP), and outputs a coding mode signal IPmode indicating which one of the intra-coding and inter-coding is performed to the target VOP.

At this time, in the shape extractor 2, the shape value Spel of the object (VOP) in each frame is extracted on the basis of the pixel value Vpel of each frame successively input. Then, in the block transparency judgement unit 3, the judgement as to whether each of the blocks constituting the target VOP is an outside-object block or not is made on the basis of the shape value Spel, and then the block transparency information Dtran indicating the result of the judgement is output block by block. In MPEG4, the coding is performed in block units and macroblock units as in MPEG1 or MPEG2.

In the shape encoder 4, the coding of the shape value Spel of the target VOP is performed block by block on the basis of the block transparency information Dtran and the coding mode signal IPmode. To be specific, when the block transparency information Dtran indicates that the target block in the target VOP is an outside-object block, a code indicating that the target block is an outside-object block is output. When the block transparency information Dtran indicates that the target block in the target VOP is not an outside-object block, a shape coded data Sstr which is obtained by coding the shape value Spel of the target block are output. At this time, as the coding of the shape value Spel of the target block, one of the intra-frame coding and inter-frame coding is performed in accordance with the coding mode signal IPmode.

In the pixel encoder 5, the coding of the pixel value Vpel of the target VOP is performed block by block on the basis of the shape value Spel, the block transparency information Dtran, and the coding mode signal IPmode. To be specific, when the block transparency information Dtran indicates that the target block in the target VOP is an outside-object block, the coding for the target block is not performed, and when the block transparency information Dtran indicates that the target block in the target VOP is not an outside-object block, the pixel coded data Vstr which is obtained by coding the pixel value Vpel of the target block are output. At this time, as the coding for the pixel value Vpel of the target block, one of the intra-frame coding and inter-frame coding is performed in accordance with the coding mode signal IPmode.

Then, in the multiplexer 6, the shape coded data Sstr and the pixel coded data Vstr are multiplexed and a multiplex coded signal VSstr is output.

When inside-object pixels and outside-pixels are mixed in the target block (unit of coding), in the pixel encoder 5, the target block is subjected to a padding process according to MPEG4 with reference to the shape value Spel, for replacing pixel values of outside-object pixels with pixel values of inside-object pixels, and the coding process is carried out for the pixel values Vpel which have been subjected to the padding process. When this padding process is performed, compression efficiency and image quality improvement of the pixel values can be realized.

FIGS. 26(a) to 26(c) are diagrams for explaining a data structure of a coded signal which is compliant with MPEG4. FIG. 26(a) shows a data structure of an image coded signal having no shape information. As described above, "VOP" is a term for representing a screen in MPEG4 and corresponds to the concept of "frame".

The coded signal (pixel value signal) Vstr having no shape information is composed of VOP headers Vvoph and pixel-related data Vmb corresponding to each macroblock, like the image coded signal defined in MPEG1 or MPEG2.

The data Vmb of each macroblock is composed of a coding mode signal Vmode and a coded data of a pixel value (pixel value code) Vcode. The coding mode signal Vmode includes coding type information Vtype and a motion vector Vmv. Here, the coding mode signal Vmode includes information for distinguishing between an intra block subjected to the intra-frame coding and an inter block subjected to the inter-frame coding, information for distinguishing between the presence and absence of motion vector data, and information for distinguishing between the presence and absence of pixel data.

In some cases, the coding of the motion vector or pixel value is omitted in accordance with each distinguishing information in the coding mode signal.

FIG. 26(b) shows a data structure of a coded signal having only shape information (shape signal). Here, the coded signal having only the shape information (shape signal) Sstr means that it includes no pixel information.

The coded signal Sstr including only the shape information is composed of VOP headers Svoph and shape-related data Smb corresponding to each macroblock, like the above-mentioned coded signal Vstr having no shape information.

The data Smb of each macroblock is composed of a coding mode signal Smode and coded data of a shape value (shape value code) Scode. The coding mode signal Smode includes a coding type information Stype and a motion vector Smv. The coding mode signal Smode includes information for distinguishing between an intra block subjected to the intra-frame coding and an inter block subjected to the inter-frame coding, information for distinguishing between the presence or absence of motion vector data, and information for distinguishing between the presence or absence of shape data.

FIG. 26(c) shows a data structure of a coded signal (pixel value signal) VSstr having shape information and pixel information. In this coded signal VSstr, the shape-related data Smb and pixel-related data Vmb are alternately arranged subsequent to VOP headers VSvoph, for each macroblock.

The coding of the pixel-related data is omitted for a target macroblock which has been judged to be an outside-object macroblock on the basis of the shape-related data.

However, it is not easy to extract shape information of an object (an image of a specific area) included in a natural image, from an image signal obtained by taking a picture of the natural image by a camera.

Practically, as a method for extracting the shape information, there is almost only a method for taking an image in an equipped environment such as a studio, subjecting an image signal which is obtained by this image-taking to the chromakey processing, and extracting the shape of the specific area in the image. In this shape information extraction method, it is difficult to realize a coding apparatus which makes the most of the features of MPEG4 principally executing the coding in object units.

SUMMARY OF THE INVENTION

It is an object of the present invention to provide an image coding method for making the most of the features of MPEG4 principally executing the coding in object units, i.e., separates a desired object (an image of a specific area) in a natural image from another region, and performing the coding for an image signal having no shape information, which is obtained by taking a picture of the natural image, and an image coding apparatus utilizing this image coding method, and a data storage medium which contains a program for realizing the image coding method by software.

Other objects and advantages of the present invention will become apparent from the detailed description and specific embodiments described are provided only for illustration since various additions and modifications within the spirit and scope of the invention will be apparent to those of skill in the art from the detailed description.

An image coding method according to a 1st aspect of the present invention, for coding pixel information which is included in an image signal of an image to be reproduced and forms a design of the image on a pixel frame, on the basis of shape information indicating an arbitrary shape on a shape frame, comprises: a pixel coding process for coding pixel information which forms a design of an area in the image, corresponding to a prescribed shape on the basis of predetermined shape information used as the shape information, which has been previously generated independently of the pixel information included in the image signal and indicates the prescribed shape on a predetermined shape frame; and a multiplexing process for generating coded data which include pixel coded data obtained by the coding of the pixel information and shape coded data corresponding to the predetermined shape information. Therefore, the coding process for the image signal having no shape information obtained by taking a picture of a natural image or the like can be performed, with making the most of the features of MPEG4 principally executing the coding process in object units, i.e., by separating a desired object (an image of a specific area) in the natural image from another area.

According to a 2nd aspect of the present invention, in the image coding method of the 1st aspect, the pixel coding process is carried out such that, on the basis of decoded shape information used as the shape information, which is obtained by decoding the shape coded data corresponding to the predetermined shape information which has been previously generated independently of the pixel information included in the image signal and indicates the prescribed shape on the predetermined shape frame, pixel information which forms a design of an area in the image corresponding to the decoded shape information is coded. Therefore, the coding process for the image signal having no shape information obtained by taking a picture of a natural image or the like can be performed, with making the most of the features of MPEG4 principally executing the coding process in object units, i.e., by separating a desired object (an image of a specific area) in the natural image from other area.

According to a 3rd aspect of the present invention, in the image coding method of the 1st aspect, a shape coding process is carried out for coding predetermined shape information used as the shape information, which has been previously generated independently of the pixel information included in the image signal and indicates the prescribed shape on the predetermined shape frame; and the multiplexing process is carried out such that coded data which include shape coded data obtained by the coding of the predetermined shape information and the pixel coded data obtained by the coding of the pixel information are generated. Therefore, the coding process for the image signal having no shape information obtained by taking a picture of a natural image or the like can be performed, with making the most of the features of MPEG4 principally executing the coding process in object units, i.e., by separating a desired object (an image of a specific area) in the natural image from another area.

According to a 4th aspect of the present invention, in the image coding method of the 1st aspect, decoded shape information which is obtained by decoding the shape coded data corresponding to the predetermined shape information which has been previously generated independently of the pixel information included in the image signal and indicates the prescribed shape on the predetermined shape frame is used as the shape information, a shape coding process is carried out for coding the predetermined decoded shape information, the pixel coding process is carried out such that pixel information which forms a design of an area in the image, corresponding to the decoded shape information, is coded on the basis of the predetermined decoded shape information, and the multiplexing process is carried out such that coded data which include shape coded data obtained by coding of the predetermined decoded shape information and the pixel coded data obtained by the coding of the pixel information are generated. Therefore, the coding process for the image signal having no shape information obtained by taking a picture of a natural image or the like can be performed, with making the most of the features of MPEG4 principally executing the coding process in object units, i.e., by separating a desired object (an image of a specific area) in the natural image from another area.

According to a 5th aspect of the present invention, in the image coding method of the 1st aspect, the pixel coding process is carried out such that shape information corresponding to a prescribed number of predetermined shape frames is used as the predetermined shape information, and the prescribed number of the predetermined shape frames are repeatedly allocated to plural pixel frames which are more than the number of the predetermined shape frames, and pixel information corresponding to the plural pixel frames is coded on the basis of the shape information corresponding to the predetermined shape frames. Therefore, the previously prepared predetermined shape information can be used effectively.

According to a 6th aspect of the present invention, in the image coding method of the 1st aspect, the pixel coding process is carried out such that shape information corresponding to a prescribed number of predetermined shape frames is used as the predetermined shape information, and the prescribed number of the predetermined shape frames are repeatedly allocated to plural pixel frames which are more than the number of the predetermined shape frames, in an order of the predetermined shape frames, and pixel information corresponding to the plural pixel frames is coded on the basis of the shape information corresponding to the predetermined shape frames. Therefore, the order of the predetermined shape frames which are made to correspond to the pixel frames becomes the same as the original order of the predetermined shape frames, regardless of the display times of the pixel frames. Accordingly, in place of the shape value, a shape signal obtained by coding the shape value can be utilized as the previously prepared shape information.

According to a 7th aspect of the present invention, in the image coding method of the 1st aspect, the pixel coding process is carried out such that shape information corresponding to a prescribed number of predetermined shape frames is used as the predetermined shape information, and a predetermined shape frame depending on time information which is set for each pixel frame is allocated to each of plural pixel frames which are more than the number of the predetermined shape frames, and pixel information corresponding to the plural pixel frames is coded on the basis of the shape information corresponding to the predetermined shape frames. Therefore, the display times of the predetermined shape frames which are made to correspond to the pixel frames become almost the same as the display times which are originally set for the predetermined shape frames, and the display of each of the shape frames which are made to correspond to the pixel frames is carried out at approximately original display timing. Consequently, the changes in the shape of a displayed image are prevented from becoming extremely abrupt or slow.

According to an 8th aspect of the present invention, in the image coding method of the 1st aspect, the predetermined shape information includes shape coded data which are obtained by previously coding shape values forming the predetermined shape frame, for each of given unit areas partitioning the predetermined shape frame, by a method which is suitable for a coding process of the pixel information. Therefore, the capacity of the memory which contains the shape information can be saved, whereby the costs can be reduced.

According to a 9th aspect of the present invention, in the image coding method of the 1st aspect, shape values forming the predetermined shape frame and first shape coded data which are obtained by previously coding the shape values by a method which is suitable for a coding process for the pixel information are used as the predetermined shape information, a shape coding process is carried out for coding the shape values forming the predetermined shape frame, as needed, by a method according to a method of a coding process for a pixel frame corresponding to the predetermined shape frame to generate second shape coded data, and the multiplexing process is carried out such that a suitable stream part in the first shape coded data, the stream part corresponding to a predetermined shape frame which conforms to a method for coding a pixel frame, and the pixel coded data are multiplexed, and an unsuitable stream part in the first shape coded data, the stream part corresponding to a predetermined shape frame which does not conform to the coding method of the pixel frame is replaced with a corresponding stream part in the second shape coded data, and the corresponding stream part and the pixel coded data are multiplexed. Therefore, shape coded data which are obtained by subjecting the shape value to the intra-frame coding are employed when the target pixel frame is an intra-frame coded frame, for example, and in other cases the shape signal included in the input shape information is employed as the shape coded data. Accordingly, this image coding method can handle cases where the input shape coded data are obtained by subjecting the pixel value to the inter-frame coding, all of which correspond to the inter shape frames.

According to a 10th aspect of the present invention, in the image coding method of the 9th aspect, the first shape coded data are obtained by subjecting all of the shape values forming the predetermined shape frame to intra-frame coding. Therefore, whether the pixel frame is a frame subjected to intra-frame coding or a frame subjected to inter-frame coding, shape coded data can be used as information of a shape frame corresponding to the pixel frame.

According to an 11th aspect of the present invention, in the image coding method of the 8th aspect, the predetermined shape information includes: in addition to the shape coded data, partition data for distinguishing partitions of stream parts corresponding to areas as units of coding, which partition each predetermined shape frame in the shape coded data; and a decoded shape value which is obtained by decoding the shape coded data. Therefore, the capacity of the memory which contains input shape information can be saved.

According to a 12th aspect of the present invention, in the image coding method of the 8th aspect, the predetermined shape information includes: in addition to the shape coded data, partition data for distinguishing partitions of stream parts corresponding to areas as units of coding, which partition each predetermined shape frame in the shape coded data; data for distinguishing whether a coding process for a pixel value is to be preformed to an area in a pixel frame corresponding to the area as the unit of coding in the predetermined shape frame; and a decoded shape value which is obtained by decoding the shape coded data. Therefore, the capacity of the memory which contains the input shape information can be saved.

According to a 13th aspect of the present invention, in the image coding method of the 1st aspect, when the size of the pixel frame is different from the size of a predetermined shape frame corresponding to the pixel frame, predetermined shape information having no corresponding pixel information is assumed to be information outside a coding target, which corresponds to an outside part of a shape on the predetermined shape frame and to which a coding process is not performed. Therefore, also when the size of the pixel frame is different from the size of the predetermined shape frame, the coding process for the image signal having no shape information can be performed in object units, with using a shape value independent of the image signal.

According to a 14th aspect of the present invention, in the image coding method of the 3rd aspect, the shape coding process is carried out such that, when the size of the pixel frame is different from the size of a predetermined shape frame corresponding to the pixel frame, a shape size conversion process for converting the predetermined shape information so that the size of the predetermined shape frame matches the size of the corresponding pixel frame is carried out, as well as coding of predetermined shape information having the converted size being carried out, the pixel coding process is carried out such that pixel information which forms a design of an area in the image, corresponding to the predetermined shape information having the converted size, is coded on the basis of the predetermined shape information having the converted size, and the multiplexing process is carried out such that coded data which include shape coded data obtained by coding of the predetermined shape information having the converted size and the pixel coded data obtained by the coding of the pixel information are generated. Therefore, when the size of the pixel frame is different from the size of the predetermined shape frame, a process for matching the size of the predetermined shape frame with the size of the pixel frame can be performed easily without processing the pixel information.

According to a 15th aspect of the present invention, in the image coding method of the 4th aspect, the shape coding process is carried out such that, when the size of the pixel frame is different from the size of a predetermined shape frame corresponding to the pixel frame, a shape size conversion process for converting the predetermined shape information so that the size of the predetermined shape frame matches the size of the corresponding pixel frame is carried out, as well as coding of predetermined shape information having the converted size being carried out, the pixel coding process is carried out such that pixel information which forms a design of an area in the image, corresponding to the predetermined shape information having the converted size, is coded on the basis of the predetermined shape information having the converted size, and the multiplexing process is carried out such that coded data which include shape coded data obtained by coding of the predetermined shape information having the converted size and the pixel coded data obtained by the coding of the pixel information are generated. Therefore, when the size of the pixel frame is different from the size of the predetermined shape frame, a process for matching the size of the predetermined shape frame with the size of the pixel frame can be performed easily without processing the pixel information.

According to a 16th aspect of the present invention, in the image coding method of the 1st aspect, the pixel coding process is carried out such that, when the size of the pixel frame is different from the size of a predetermined shape frame corresponding to the pixel frame, a pixel size conversion process for converting pixel information corresponding to the pixel frame so that the size of the pixel frame matches the size of the corresponding predetermined shape frame is carried out, as well as coding of the pixel information having the converted size in the image, which forms the design of the area corresponding to the prescribed shape, being carried out on the basis of the predetermined shape information, and the multiplexing process is carried out such that coded data which include pixel coded data obtained by coding the pixel information having the converted size and shape coded data corresponding to the predetermined shape information are generated. Therefore, when the size of the pixel frame is different from the size of the predetermined shape frame, a process for matching the size of the pixel frame with the size of the predetermined shape frame can be performed easily without processing the shape information.

An image coding apparatus according to a 17th aspect of the present invention, for coding pixel information which is included in an image signal of an image to be reproduced and forms a design of the image on a pixel frame, on the basis of shape information indicating an arbitrary shape on a shape frame, comprises: a pixel encoder for coding pixel information which forms a design of an area in the image, corresponding to a prescribed shape on the basis of predetermined shape information used as the shape information, which has been previously generated independently of the pixel information included in the image signal and indicates the prescribed shape on a predetermined shape frame, and outputting pixel coded data; and a multiplexer for generating coded data which include the pixel coded data and shape coded data corresponding to the predetermined shape information. Therefore, the coding process for the image signal having no shape information obtained by taking a picture of a natural image or the like can be performed, with making the most of the features of MPEG4 principally executing the coding process in object units, i.e., by separating a desired object (an image of a specific area) in the natural image from another area. Further, the quantity of the operation of the shape encoder can be reduced and the high-speed image coding apparatus can be realized.

According to an 18th aspect of the present invention, there is provided a data storage medium which contains a program for implementing an image coding process for coding pixel information which is included in an image signal of an image to be reproduced and forms a design of the image on a pixel frame, on the basis of shape information indicating an arbitrary shape on a shape frame, by a computer, this program is an image coding program for performing, by the computer: a pixel coding process for coding pixel information which forms a design of an area in the image, corresponding to a prescribed shape on the basis of predetermined shape information previously generated independently of pixel information used as the shape information, which is included in the image signal and indicates the prescribed shape; and a multiplexing process for generating coded data which include pixel coded data obtained by the coding of the pixel information and shape coded data corresponding to the prescribed shape information. Therefore, the coding process for the image signal having no shape information obtained by taking a picture of a natural image or the like can be performed by the computer, with making the most of the features of MPEG4 principally executing the coding in object units.

BRIEF DESCRIPTION OF THE DRAWINGS

FIGS. 19(a) and 19(b) are diagrams for explaining an image coding method according to a ninth embodiment of the present invention, and show the correspondence between a pixel value and a shape value.

FIG. 20 is a diagram for explaining a shape value coding process in MPEG4.

FIGS. 26(a) to 26(c) are diagrams for explaining a coded signal which is defined in MPEG4. FIG. 26(a) shows an image coded signal having no shape information. FIG. 26(b) shows an image coded signal having only shape information. FIG. 26(c) shows an image coded signal having shape information.

DETAILED DESCRIPTION OF THE PREFERRED EMBODIMENTS

Initially, the fundamental principles of the present invention are described.

In an image coding method according to the present invention, the shape of an object in a process target image to be processed is not extracted but the shape value corresponding to the shape of an image (background) to be composed therewith is previously prepared, whereby a specific area (foreground) in the target image to be processed, corresponding to the shape of the image to be composed is extracted on the basis of the shape value, and only the coding of pixel values corresponding to the specific area is made possible. In this image coding method, the coding for pixel values corresponding to a part outside the specific area in the target image to be processed is dispensed with, and therefore the compression efficiency for an image signal for reproducing a composed image which is composed of the background and the foreground can be improved.

FIGS. 27(a) to 27(d) are diagrams for explaining the coding in object units according to the present invention as compared to the prior art coding in object units.

Figure 27:
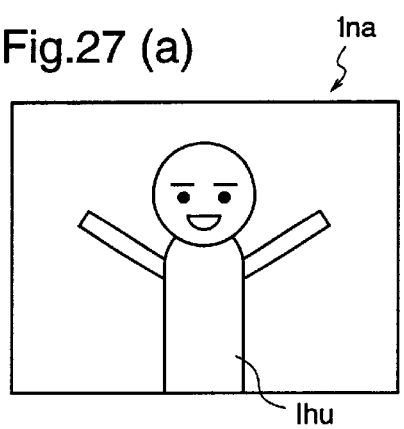
FIGS. 27(a) to 27(d) are diagrams for explaining fundamental principles of the present invention, and show a process for coding an image signal having no shape information in object units on the basis of a shape value independent of the image signal.
Figure 27:
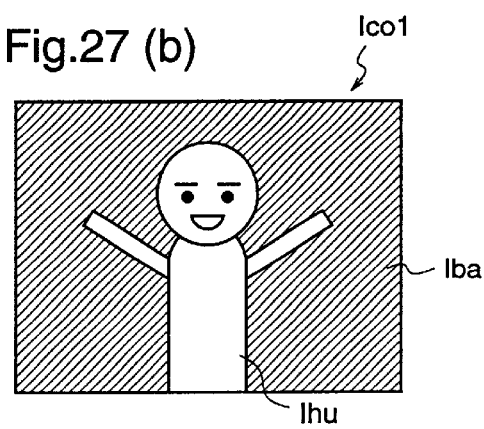
Figure 27:
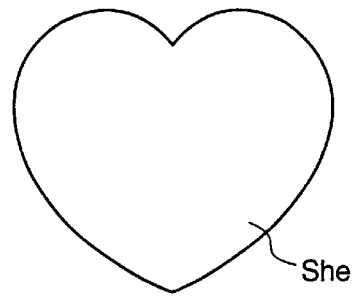
Figure 27:
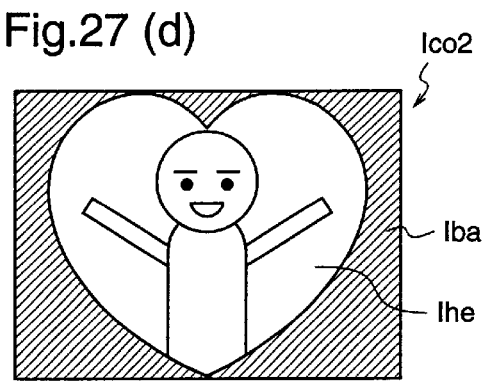

In the prior art image coding in object units, on the basis of the pixel values of a natural image Ina obtained by taking an image of a human (see FIG. 27(a)), a shape value which indicates the outside shape of the human image Ihu is extracted and the extracted shape value is coded, as well as only the pixel value of the human image Ihu among the pixel values of the natural image Ina being coded using the shape value. Then, an image coded signal of a composed image Icol (see FIG. 27(b)) which is. obtained by superimposing the human image Ihu on the background image Iba is generated.

In the image coding method according to the present invention, a shape value indicating a shape, such as a heart shape She (see FIG. 27(c)), which matches with the background Iba is previously prepared and then the shape value is coded, as well as only the pixel values forming the design of the image Ihe of the inside part of the heart shape She among the pixel values of the natural image Ina being coded using the shape value, and then an image coded signal corresponding to a composed image Ico2 (see FIG. 27(d)) which is obtained by superimposing the image Ihe of the inside part of the heart shape She on the background image Iba is generated.

In the image coding processing according to the present invention, coded data of the pixel value which corresponds to an image having a desired outline (for example, heart-shaped outline) (i.e., an image which is obtained by cutting an area corresponding to the heart shape out of the natural image Ina) are obtained. Accordingly, on the user side, the image having the desired outline, such as the heart shape, can be freely composed with another image using the coded data to display a composed image.

Further, in the image coding method of the present invention, a shape signal which is obtained by previously coding the shape value indicating the shape such as the heart shape She (see FIG. 27(c)) is prepared, then an image signal which corresponds to the natural image Ina having no shape information is subjected to the coding in object units on the basis of a shape value which is obtained by decoding the shape signal, and then so-obtained image coded data in object units are output together with the shape signal.

In this image coding processing of carrying out the above-mentioned process, the quantity of the operation of the shape encoder can be reduced and a high-speed image coding apparatus can be realized.

Here, to simplify the description, the shape value indicating the shape (heart shape She) which matches with the background Iba has been described as an example. However, the shape value can be selected independently of the background Iba.

Hereinafter, embodiments of the present invention will be described with reference to FIGS. 1 to 23.

[Embodiment 1]

Figure 1:
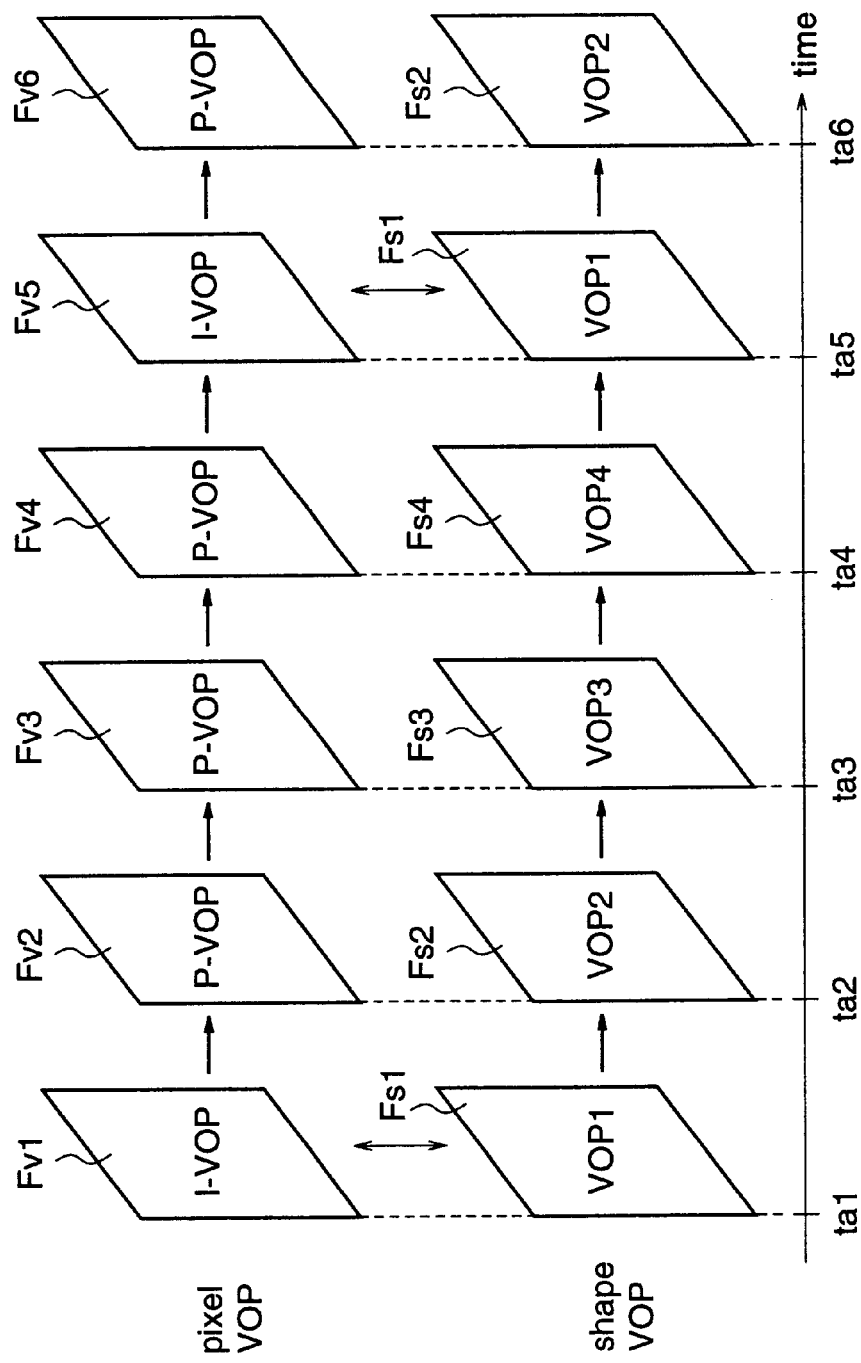
FIG. 1 is a diagram for explaining an image coding method according to a first embodiment of the present invention, and shows the correspondence between a screen which corresponds to a pixel value (pixel VOP) and a screen which corresponds to a shape value (shape VOP).

FIG. 1 is a diagram for explaining an image coding method according to the first embodiment of the present invention, and shows the correspondence between screens (pixel VOPS) obtained from pixel values and screens (shape VOPs) obtained from shape values. Here, the shape values corresponding to four shape VOPs (Fs1~Fs4) are prepared. The number of the pixel VOPs to be handled (Fv1, Fv2, Fv3, Fv4, Fv5, Fv6, ...) is an arbitrary value which is equal to or more than the number of the shape VOPs.

In this case, as shown in FIG. 1, the shape values associated with four shape VOPs are repeatedly employed, whereby the shape VOPs can be allocated to an arbitrary number of pixel VOPs. Here, ta1 to ta6 are the times when the pixel VOPs are displayed, respectively. The times when the shape VOPs are displayed match the display times of the corresponding pixel VOPs, respectively. Further, the pixel VOPs Fv1 and Fv5 are I-VOPs which are subjected to the intra-frame coding, and the pixel VOPs Fv2, Fv3, Fv4, and Fv6 are P-VOPs which are subjected to the inter-frame coding.

In the correspondence between the pixel VOPs and the shape VOPs as shown in FIG. 1, the display times of the shape VOPs (Fs1) match the display times of the I-VOPs (Fv1 and Fv5) whose pixel values are subjected to the intra-frame coding. However, there is no need for the display times of the shape VOP1 (Fs1) to always match the display times of the pixel I-VOPs (Fv1 and Fv5).

When the shape value or pixel value constitutes the image signal of a moving picture, the display time is normally given to each shape VOP or pixel VOP.

As shown in FIG. 1, when the display time of each pixel VOP matches the display time of a shape VOP corresponding to each pixel VOP, the coding of the pixel value using the shape value is simple. However, generally, the display times of the both of the VOPs are not always the same.

Figure 2:
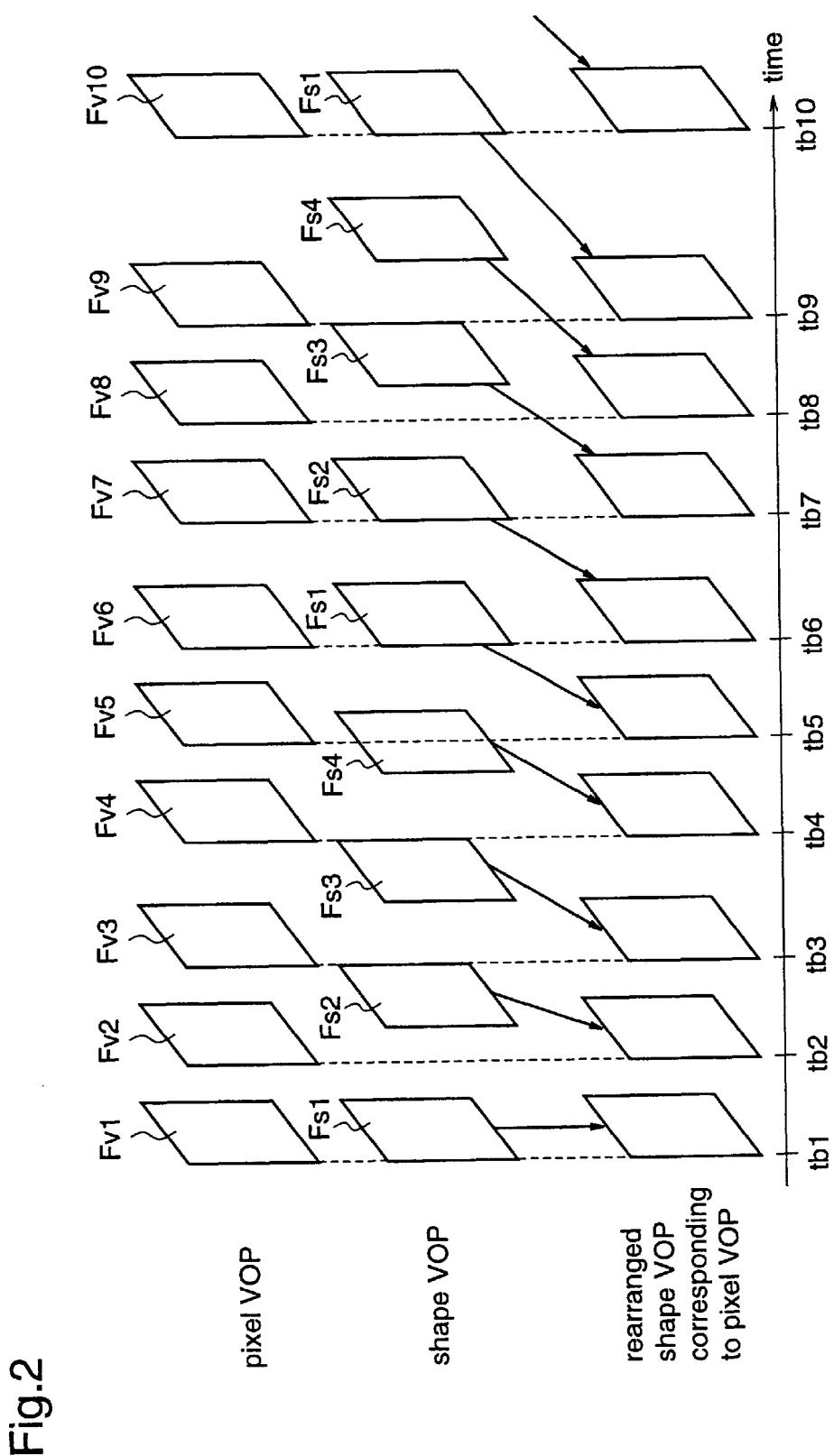
FIG. 2 is a diagram for explaining the image coding method according to the first embodiment, and shows the correspondence between a pixel VOP and a shape VOP in a case where the display time of the pixel VOP does not match the display time of the shape VOP.

FIG. 2 shows the correspondence between pixel VOPs and shape VOPs in a case where the display times of the pixel VOPs do not match the display times of the shape VOPs. Here, tb1 to tb10 are the times when the pixel VOPs (Fv1~Fv10) are displayed, respectively. The times when the repeatedly-used shape VOPs (Fs1~Fs4) are displayed do not always match the display times of the corresponding pixel VOPs.

In this first embodiment, when the display times of the shape VOPs do not match the display times of the pixel VOPs, the display times of the shape VOPs are ignored, and the shape VOPs are allocated to the pixel VOPs in the order of the display time beginning from a shape VOP having the earliest-display time.

In this method of so allocating the shape VOPs to the pixel VOPs, the order of the shape VOPs which are made correspond to the pixel VOPs is the same as the original order of the shape VOPs, regardless of the display times of the pixel VOPs. Therefore, in place of the shape value, the shape signal which is obtained by coding the shape value can be utilized as the previously prepared shape information.

Hereinafter, a description is given of an image coding apparatus which performs the process of the image coding method according to the first embodiment.

Figure 3:
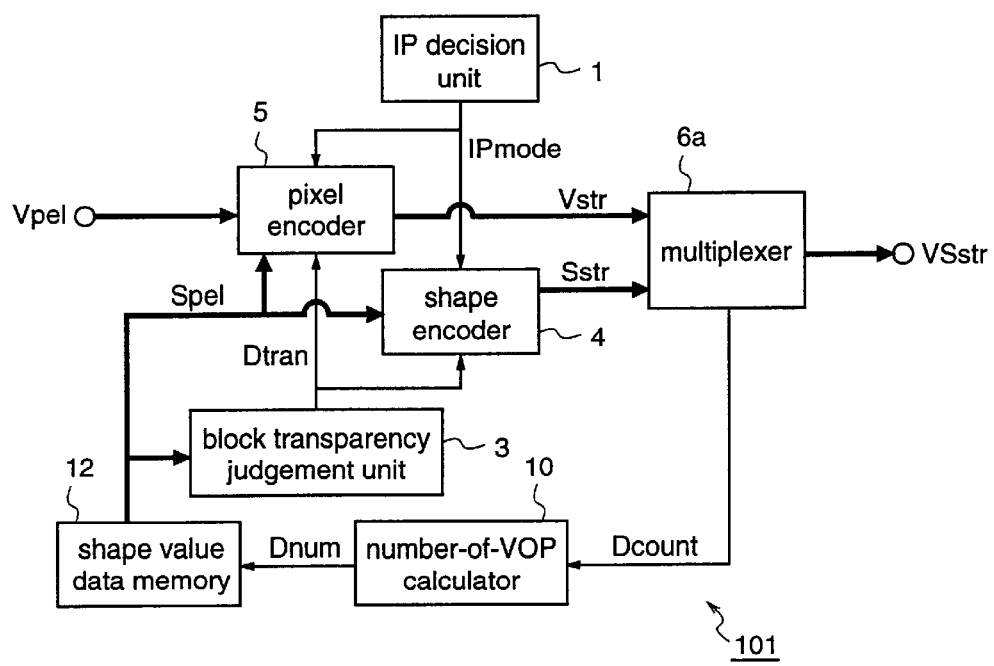
FIG. 3 is a block diagram for explaining an image coding apparatus according to the first embodiment.

FIG. 3 is a block diagram for explaining the image coding apparatus of the first embodiment.

The image coding apparatus 101 of the first embodiment comprises a multiplexer 6a, in place of the multiplexer 6 of the prior art image coding apparatus 200, for multiplexing shape coded data Sstr and pixel coded data Vstr and outputting a multiplex coded signal VSstr including a VOP header of each VOP, as well as outputting information Dcount on the number of VOPs (hereinafter, referred to as number-of-VOP information) indicating the number of VOPs, which corresponds to the number of the output multiplex coded signals.

Further, the image coding apparatus 101 of the first embodiment comprises a shape value data memory 12 which contains shape values corresponding to a predetermined number of VoPs and a unit 10 for calculating the number of VOPs (hereinafter, referred to as a number-of-VOP calculator) for outputting VOP number information Dnum which designates the number of a predetermined VOP among plural VOPs whose shape values are stored in the shape value data memory 12 on the basis of the number-of-VOP information Dcount from the multiplexer 6a, in place of the shape extractor 2 of the prior art image coding apparatus 200.

Other construction of the image coding apparatus 101 of the first embodiment is identical to that of the prior art image coding apparatus 200.

Next, the operation of the image coding apparatus 101 will be described.

The operation of the image coding apparatus 101 of the first embodiment is identical to that of the prior art image coding apparatus 200 except that the shape value Spel stored in the shape value data memory 12 is output to a block transparency judgement unit 3, a shape encoder 4 and a pixel encoder 5 on the basis of the VOP number information Dnum.

Then, the operation of the shape value data memory 12 for outputting the shape value Spel is described.

In the multiplexer 6a, the process for multiplexing the shape coded data Sstr and the pixel coded data Vstr is carried out, and a multiplex coded signal VSstr including the VOP header of each VOP is output. At this time, in the multiplexer 6a, the number-of-VOP information Dcount which indicates the number of VOPs (Cnum) corresponding to the number of the output multiplex coded signals is output to the number-of-VOP calculator 10.

Then, in the number-of-VOP calculator 10, the shape VOP number (OUTnum) whose shape value Spel is to be read from the shape value data memory 12 is calculated on the basis of the VOP-number information Dcount, and number information (Dnum) indicating this number is output to the shape value data memory 12.

To be more specific, the number (OUTnum) of the shape VOP whose shape value Spel is to be read is obtained by the following Expression (1), assuming that total number of shape VoPs whose shape values are stored in the shape value data memory 12 is MAXnum and CURnum pieces of shape VOPs are repeatedly used as the shape values.

$$Cnum = CURnum \times N + OUTnum \qquad (1)$$

Here, Cnum is the number of multiplexed VOPs, CURnum is a natural number which is equal to or smaller than MAXnum, and N is such ah integer that OUTnum becomes 0 or larger and smaller than CURnum.

That is, the shape VOP number (OUTnum) is a remainder which is obtained when the number of VOPs (Cnum) whose corresponding multiplex coded signals have been output is divided by the natural number CURnum which is equal to or smaller than the total number (MAXnum) of the shape VOPs whose shape values are stored in the shape value data memory 12.

As described above, the image coding apparatus 101 according to the first embodiment comprises the shape value data memory 12 which contains the shape values independent of an image signal having no shape information, the coding of the pixel value included in the image signal is performed on the basis of the shape value read from the shape value data memory 12, as well as the shape value being coded and a coded signal corresponding to the pixel value (pixel coded data) and a coded signal corresponding to the shape value (shape coded data) are multiplexed and output. Therefore, the coding process in object units for the image signal having no shape information can be performed without extracting the shape information of a specific area in the natural image from the image signal having no shape information, which corresponds to an image such as the natural image.

That is, the coding of the pixel values of only part of the natural image can be performed using the shape values stored in the shape value data memory 12, and thereby the coding of the image signal having no shape information, such as the natural image, can be performed, with making the most of the features of MPEG4 principally executing the coding process in object units, without performing the process for extracting the shape of an object from the image signal, which is practically not easy.

Further, the shape values of the shape VOPs are read from the shape value data memory 12 in the order of the display times beginning from the one having the earliest display time and successively allocated to the pixel VOPs. Therefore, the order of the shape VOPs which are made to correspond to the pixel VOPs is the same as the original order of the shape VOPs, regardless of the display times of the pixel VOPs and accordingly, in place of the shape value, the shape signal which is obtained by coding the shape value can be use as the shape information which is to be previously prepared.

[Embodiment 2]

Figure 4:
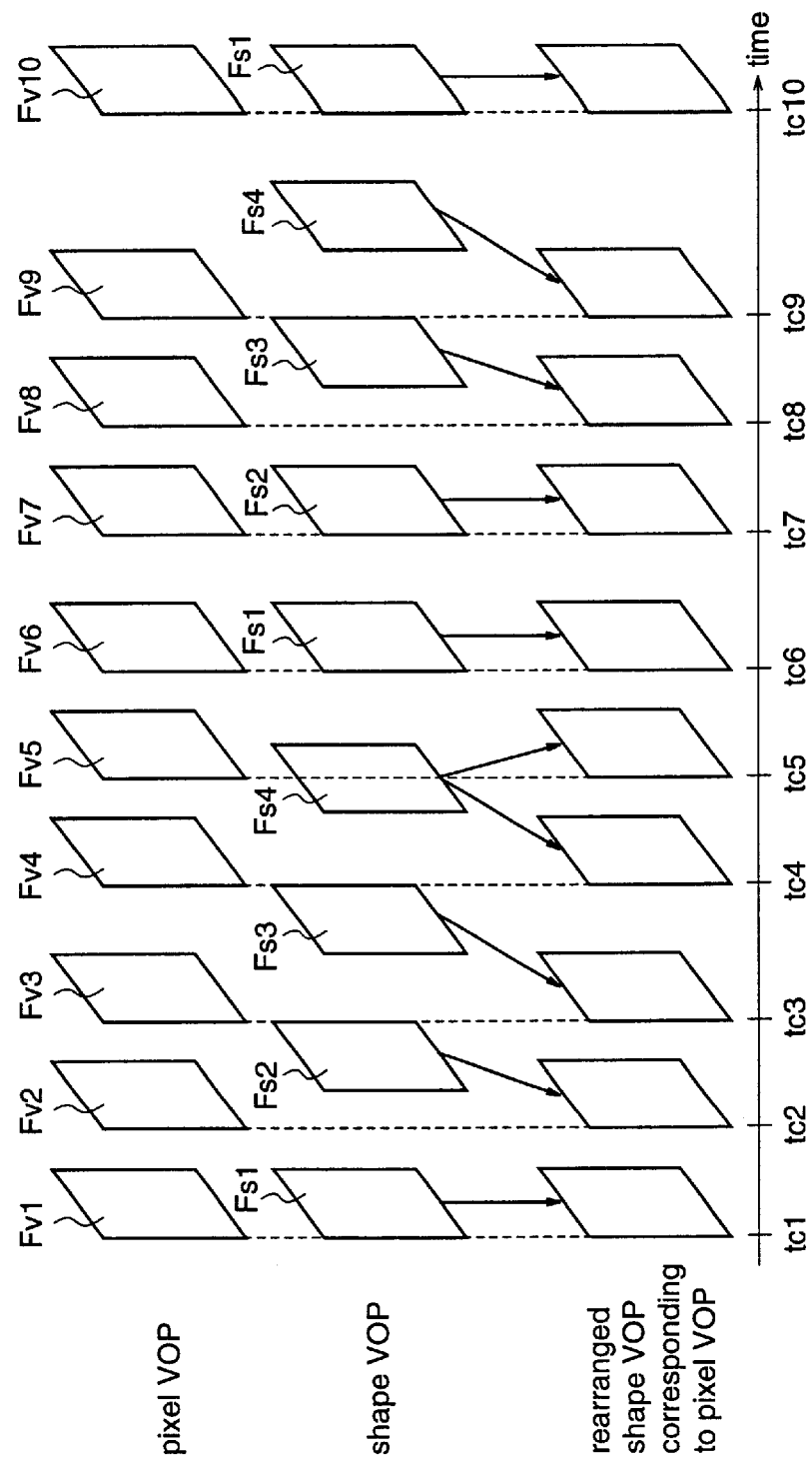
FIG. 4 is a diagram for explaining an image coding method according to a second embodiment of the present invention, and shows the correspondence between a pixel VOP and a shape VOP in a case where the display time of the pixel VOP does not match the display time of the shape VOP.

FIG. 4 is a diagram for explaining an image coding method according to the second embodiment of the present invention, and shows the correspondence between the pixel VOPs and the shape VOPs in a case where display times of the pixel VoPs do not match the display times of the shape VOPs. Here, tc1~tc10 are the times when the pixel VOPs (Fv1~Fv10) are displayed, respectively. The times when repeatedly-used shape VOPs (Fs1~Fs4) are displayed do not always match the display times of the corresponding pixel VOPs.

In this second embodiment, unlike in the first embodiment, a shape VOP is allocated to each pixel VOP, the shape VOP having the display time which is nearest to the display time of the pixel VOP.

In the method for so allocating the shape VOP to the pixel VOP, the display times of the shape VOPs which are made to correspond to the pixel VOPs become almost the same as the display times which are originally set for the shape VOPs, and the display of the shape VOPs which are made to correspond to the pixel VOPs is carried out approximately at original display timing, respectively. Accordingly, the changes in the shape of a displayed image can be prevented from becoming extremely abrupt or slow.

Hereinafter, a description is given of an image coding apparatus which performs the process of the image coding method according to the second embodiment.

Figure 5:
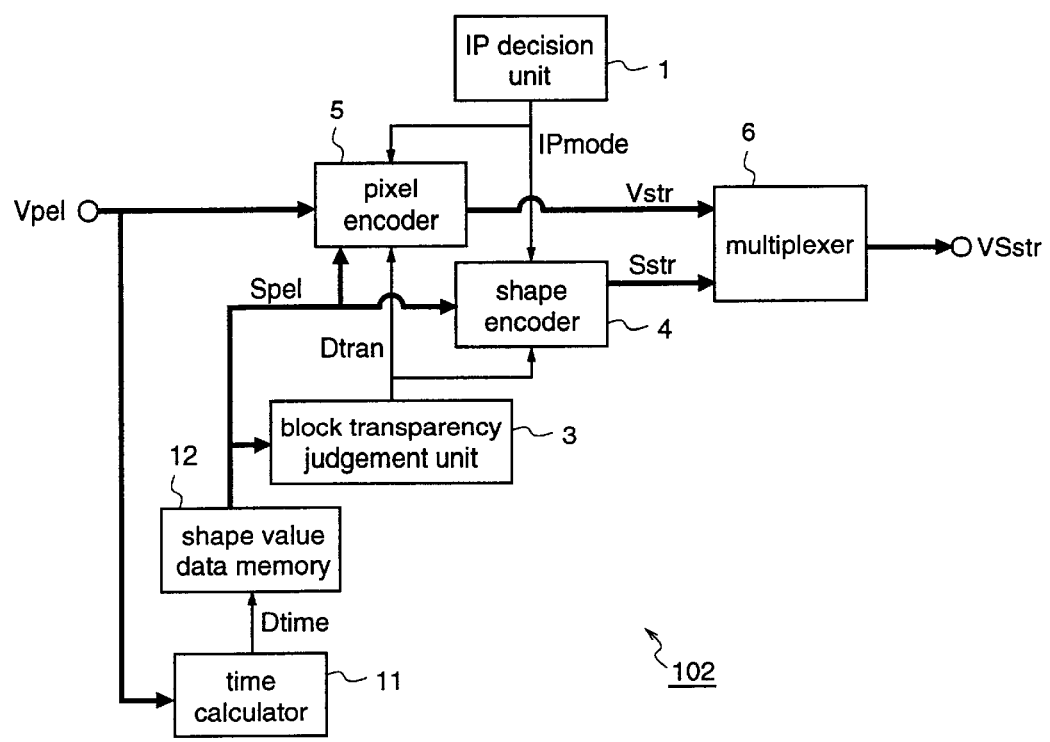
FIG. 5 is a block diagram for explaining an image coding apparatus according to the second embodiment.

FIG. 5 is a block diagram for explaining the image coding apparatus according to the second embodiment.

The image coding apparatus 102 according to the second embodiment comprises a shape value data memory 12 which contains shape values the number of which corresponds to a predetermined number of VOPs and a time calculator 11 for outputting time information Dtime which indicates a display time Ctime associated with a shape VOP to be read from the shape value data memory 12 on the basis of the pixel value Vpel, in place of the shape extractor 2 of the prior art image coding apparatus 200. The shape value of a predetermined shape VOP is read from the shape value data memory 12 on the basis of the time information Dtime.

Other construction of the image coding apparatus 102 according to the second embodiment is identical to that of the prior art image coding apparatus 200.

Next, the operation of the image coding apparatus 102 will be described.

The image coding apparatus 102 of the second embodiment is the same as the prior art image coding apparatus 200 except that the shape value Spel stored in the shape value data memory 12 is output to the block transparency judgement unit 3, the shape encoder 4 and the pixel encoder 5 on the basis of the time information Dtime from the time calculator 11.

Thus, the operation of reading the shape value Spel from the shape value data memory 12 is described.

In the time calculator 11, the time Ctime when each pixel VOP is displayed (specifically, the display times Tc1~Tc10 of the pixel VOPs as shown in FIG. 4) is extracted on the basis of the pixel value Vpel included in an image signal, and then the time information Dtime which indicates the display time Stime of the shape VOP corresponding to the display time Ctime is output to the shape value data memory 12.

To be more specific, in the time calculator 11, the display time Stime is obtained by the following Expression (2), assuming that the maximum display time of the shape VOP whose shape value has been stored in the shape value data memory 12 is MAXtime and shape VoPs during a time period of CURtime are repeatedly used as the shape values.

$$Ctime = CURtime \times N + Stime \qquad (2)$$

Here, Ctime is the time when a pixel VOP corresponding to an input pixel value is displayed, and CURtime is the display interval (integer which is equal to or smaller than MAXnum) of one cycle in which the shape VOPs are used. N is such an integer that Stime becomes 0 or larger and smaller than CURtime. The maximum display time (MAXtime) is the time period taken to display all shape VOPs.

In this way, the image coding method conforming to MPEG4, which performs the coding of pixel values of an arbitrary number of pixel VOPs with repeatedly using the shape values of independent shape VOPs can be realized.

As described above, the image coding apparatus 102 of the second embodiment comprises the shape value data memory 12 which contains shape values independent of the image signal having no shape information, performs the coding of the pixel value and the coding of the shape value, and multiplexes a coded signal associated with the pixel value (pixel coded data) and a coded signal associated with the shape value (shape coded data) as in the first embodiment. Therefore, this image coding apparatus can perform the coding of the image signal having no shape information such as the natural image, with making the most of the features of MPEG4 principally executing the coding in object units, without performing the processing of extracting the shape of an object from the image signal, which is practically not easy.

Further, in this second embodiment, unlike in the first embodiment, a shape VOP is allocated to each pixel VOP, the shape VOP having the display time which is nearest to the display time of the pixel VOP. Therefore, the display time of the shape VOP which is made to correspond to the pixel VOP becomes almost the same as the display time which is originally set for the shape VOP, and the display of the shape VOPs which are made to correspond to the pixel VOPs is carried out approximately at the original display timing, respectively. Thereby, the changes in the shape of the displayed image can be prevented from becoming extremely abrupt or slow.

In this second embodiment, when the shape value data memory 12 extracts the shape value of the shape VOP corresponding to the display time Stime of the shape VOP, the following three methods are possible and any of the three methods can be adopted.

The first method is the method used in the second embodiment for extracting the shape value of the shape VOP having the display time nearest to the display time Stime.

The second method is a method for extracting the shape value of the shape VOP having the maximum time which is equal to or smaller than the display time Stime.

The third method is a method for extracting the shape value of the shape VOP having the minimum time which is equal to or larger than the display time Stime.

In addition, in the first and second embodiments, the image coding apparatus performs the image coding process conforming to MPEG4, with using the pixel values Vpel associated with plural pixel VOPs constituting video and the shape values Spel associated with a predetermined number of shape VOPs stored in the memory. However, the shape information to be used in the image coding process conforming to MPEG4 may be a shape signal which is obtained by coding a shape value.

When the shape signal obtained by previously coding the shape value is employed as the shape information, the capacity of the memory which contains the shape information or the time taken to transmit the shape information via a transmission line can be saved. Consequently, the costs of the image coding apparatus can be decreased or the quantity of the shape information to be prepared can be increased.

Hereinafter, the coding process in which the shape signal, which is obtained by previously coding a shape value, is used as the shape information will be described as third and fourth embodiments of the present invention.

[Embodiment 3]

Figure 6:
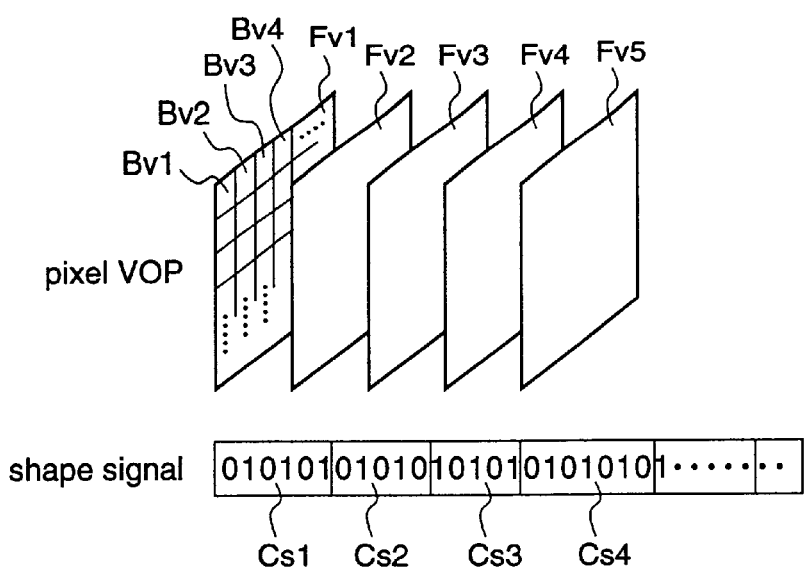
FIG. 6 is a diagram for explaining an image coding apparatus according to a third embodiment of the present invention, and shows a signal which is input to the image coding apparatus.

FIG. 6 is a diagram for explaining an image coding apparatus according to the third embodiment of the present invention, and shows a signal which is input to the image coding apparatus.

In this third embodiment, as shown in FIG. 6, a shape signal which is obtained by the coding of a shape value is employed as shape information associated with plural pixel VOPs (Fv1, Fv2, Fv3, Fv4, Fv5, . . . ) constituting the video. In this shape signal, a code associated with the shape VOP is allocated to each pixel VOP. Further, to macroblocks Bv1, Bv2, Bv3, Bv4, . . . constituting the pixel VOP, the shape value codes Cs1, Cs2, Cs3, Cs4, . . . associated with the macroblocks which constitute the corresponding shape VOP are allocated, respectively.

Hereinafter, the image coding apparatus which performs the process according to the image coding method of the third embodiment will be described.

Figure 7:
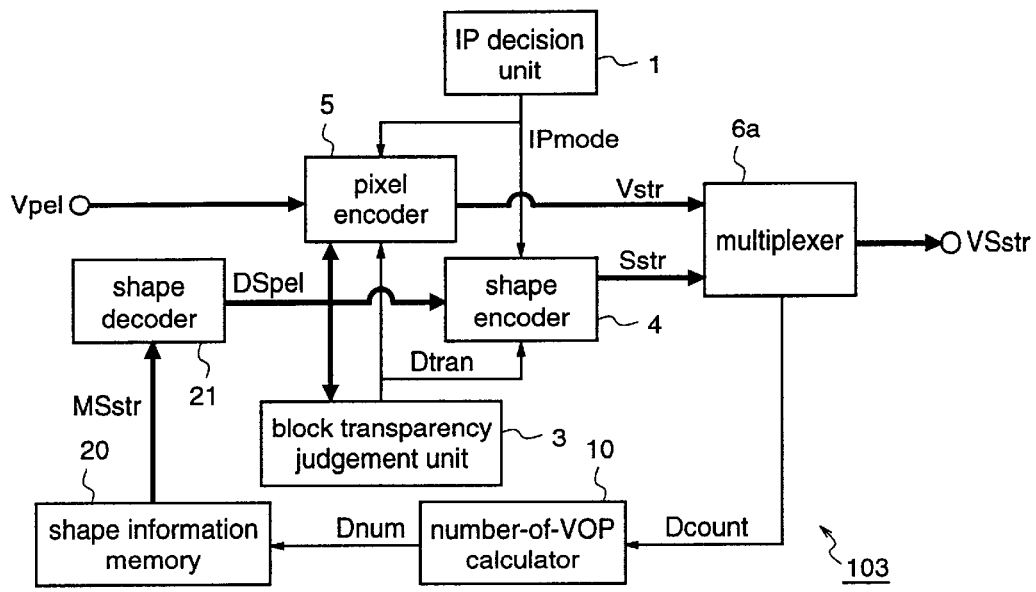
FIG. 7 is a block diagram for explaining the image coding apparatus according to the third embodiment.

FIG. 7 is a block diagram for explaining the image coding apparatus according to the third embodiment.

The image coding apparatus 103 of the third embodiment comprises a shape information memory 20 which contains a shape signal MSstr which is obtained by previously coding a shape value, and a shape decoder 21 for decoding the shape signal MSstr read from the shape information memory 20 and outputting a decoded shape value DSpel, in place of the shape value data memory 12 in the image coding apparatus 101 of the first embodiment 1 as shown in FIG. 3.

Here, the shape information memory 20 receives the number information Dnum from the number-of-VOP calculator 10, and outputs the shape signal MSstr associated with a shape VOP having the VOP number indicated by the number information Dnum, to the shape decoder 21. The shape decoder 21 outputs the decoded shape value DSpel which is obtained by decoding the shape signal MSstr to the pixel encoder 5, the shape encoder 4 and the block transparency judgement unit 3.

Other construction of the image coding apparatus 103 of the third embodiment is identical to that of the image coding apparatus 101 of the first embodiment.

Next, the operation of the image coding apparatus 103 will be described.

In the image coding apparatus 103, when the coding process for the pixel value Vpel is performed, the shape signal MSstr associated with the shape VOP having a predetermined VOP number is output from the shape information memory 20 on the basis of the number information Dnum from the number-of-VOP calculator 10. Then, the shape signal MSstr is decoded by the shape decoder 21 and the decoded shape value DSpel is output to the pixel encoder 5, the shape encoder 4 and the block transparency judgement unit 3.

Other operation of the image coding apparatus 103 is identical to that of the image coding apparatus 101 of the first embodiment.

In the image coding apparatus 103 of the third embodiment, the shape information memory 20 which contains the shape signal MSstr which is obtained by previously coding the shape value and the shape decoder 21 for decoding the shape signal MSstr read from the shape information memory 20 and outputting the decoded shape value DSpel are included, and the coding of the pixel value is performed on the basis of the decoded shape value DSpel which is obtained by decoding the shape signal stored in the shape information memory 20 as well as the coding of the decoded shape value DSpel being performed, and the pixel coded data Vstr and the shape coded data Sstr are multiplexed and output. Therefore, the coding of the image signal having no shape information, such as the natural image, can be performed, with making the most of the features of MPEG4 principally executing the coding process in object units. In addition to the above-mentioned effects, the capacity of the memory which contains the shape information can be reduced, whereby the costs can be saved.

Figure 8:
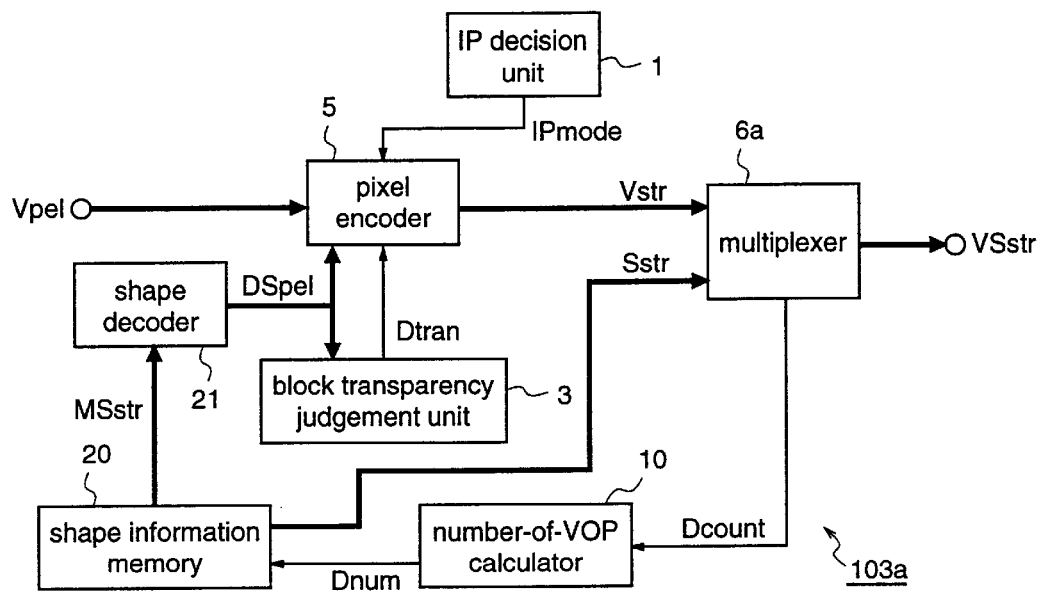
FIG. 8 is a block diagram for explaining the image coding apparatus according to the third embodiment.

In this third embodiment, the decoded shape value DSpel which is obtained by decoding the shape signal previously stored in the shape information memory 20 is coded by the shape encoder 4 and then the resultant shape coded data are output to the multiplexer 6a. However, there are some cases where the shape coded data Sstr output from the shape encoder 4 and the shape signal which is obtained by previously coding the shape value and stored in the shape information memory 20 are the same data. In these cases, like in an image coding apparatus 103a as shown in FIG. 8, the shape signal stored in the shape information memory 20 can be output to the multiplexer 6a as the shape coded data Sstr. In these cases, it is unnecessary for the image coding apparatus 103a to include the shape encoder 4 included in the image coding apparatus 103, as shown in FIG. 8.

[Embodiment 4]

Figure 9:
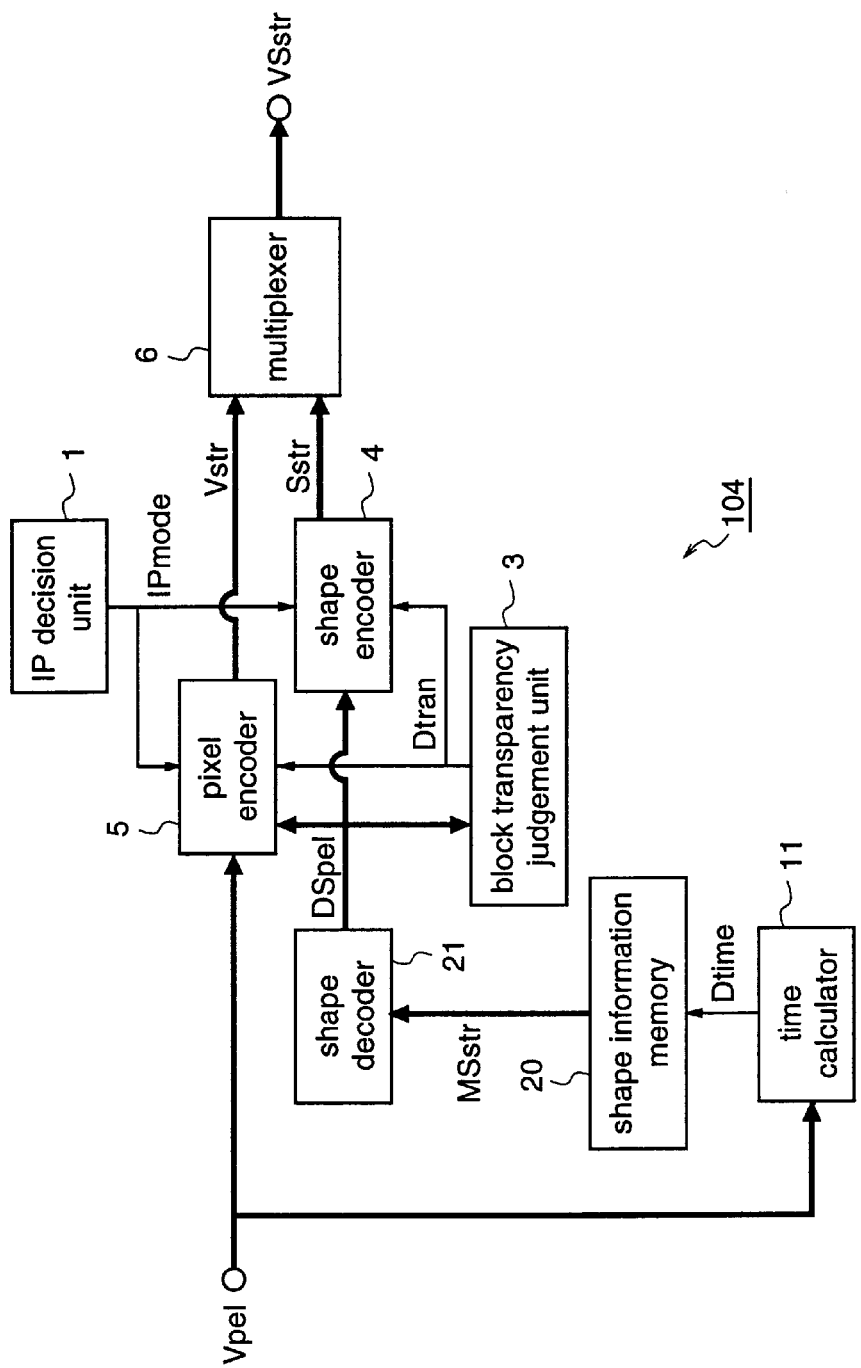
FIG. 9 is a block diagram for explaining an image coding apparatus according to a fourth embodiment of the present invention.

FIG. 9 is a block diagram for explaining an image coding apparatus according to the fourth embodiment of the present invention.

The image coding apparatus 104 of the fourth embodiment comprises a shape information memory 20 which contains a shape signal MSstr obtained by previously coding a shape value, and a shape decoder 21 for decoding the shape signal MSstr read from the shape information memory 20 and outputting a decoded shape value DSpel, in place of the shape value data memory 12 in the image coding apparatus 102 of the second embodiment as shown in FIG. 5.

The shape information memory 20 outputs the contained shape signal MSstr to the shape decoder 21 on the basis of the time information Dtime from the time calculator 11. The shape decoder 21 outputs the decoded shape value DSpel which is obtained by decoding the shape signal MSstr to the pixel encoder 5, the shape encoder 4 and the block transparency judgement unit 3.

Other construction of the image coding apparatus 104 of the fourth embodiment is identical to that of the image coding apparatus 102 of the second embodiment.

Next, the operation of the image coding apparatus 104 will be described.

In the image coding apparatus 104, when the coding of the pixel value Vpel is performed, the shape signal MSstr associated with a shape VOP having a predetermined display time is output from the shape information memory 20 on the basis of the time information Dnum from the time calculator 11. Then, the shape signal MSstr is decoded by the shape decoder 21 and the decoded shape value DSpel is output to the pixel encoder 5, the shape encoder 4 and the block transparency judgement unit 3.

Other operation of the image coding apparatus 104 is identical to that of the image coding apparatus 102 of the second embodiment.

In the image coding apparatus 104 of the fourth embodiment, the shape information memory 20 which contains the shape signal obtained by previously coding the shape value, and the shape decoder 21 for decoding the shape signal MSstr read from the shape information memory 20 and outputting the decoded shape value DSpel are included, and the coding of the pixel value is performed on the basis of the decoded shape value DSpel which is obtained by decoding the shape signal stored in the shape information memory 20, as well as the coding of the decoded shape value DSpel being performed, and the pixel coded data and the shape coded data are multiplexed and output. Therefore, the coding of the image signal having no shape information, such as the natural image, can be performed, with making the most of the features of MPEG4 principally executing the coding process in object units. In addition to these effects, the capacity of the memory which contains the shape information can be saved, whereby the costs can be reduced.

Further, in this fourth embodiment, unlike in the third embodiment, a shape VOP is allocated to a pixel VOP, the shape VOP having the display time which is nearest to the display time of the pixel VOP. Therefore, the display time of the shape VOP which is made to correspond to the pixel VOP becomes almost the same as the display time which is originally set for the shape VOP, whereby the changes in the shape of the displayed image can be prevented from becoming extremely abrupt or slow.

[Embodiment 5]

Figure 10:
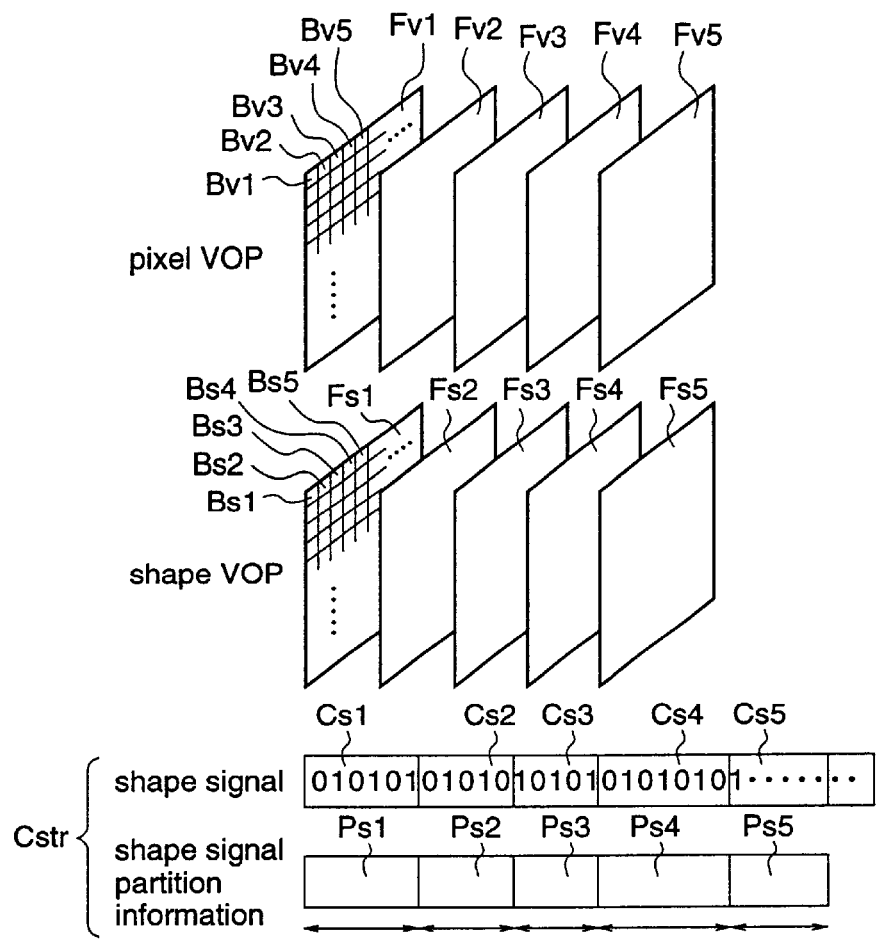
FIG. 10 is a diagram for explaining an image coding apparatus according to a fifth embodiment of the present invention, and shows information which is input to this image coding apparatus.

FIG. 10 is a diagram for explaining an image coding apparatus according to the fifth embodiment of the present invention, and shows information which is input to this image coding apparatus.

In addition to the information which is input to the image coding apparatus 103 of the third embodiment, i.e., the pixel value Vpel associated with each pixel VOP and the shape signal MSstr (see FIG. 6) associated with each shape VOP, the shape value Spel associated with each shape VOP and partition information Ps1, Ps2, Ps3, Ps4, Ps5, . . . which indicate partitioning positions associated with shape macroblocks Bs1, Bs2, Bs3, Bs4, Bs5, . . . in the shape value code are input to the image coding apparatus 105 of the fifth embodiment. Here, the shape macroblocks constitute the shape VOP.

When the shape coded data having a data structure according to MPEG4 can employ the same value of the shape information in a case where the shape coded data constitute a coded signal including only the shape information (see FIG. 26(b)) and in a case where the shape coded data constitute a coded signal including the shape information and the pixel information (see FIG. 26(c)), an input coded signal Cstr is assumed to include coded data Sstr including only the shape information (see FIG. 26(b)). In the image coding apparatus, the shape coded data Sstr including only the shape information (see FIG. 26(b)) is extracted from the coded signal Cstr, whereby the shape coded data Sstr corresponding to each pixel VOP can be generated without performing the coding of the shape value.

The shape signal obtained by coding the shape value is divided into macroblocks as units of the coding process. However, the shape coded data obtained from the coded signals Cstr are not divided into macroblocks. Thus, in order to divide the shape coded data obtained from the input coded signal Cstr into macroblocks, the input coded signal Cstr is required to include partition information for partitioning the shape coded data obtained from the input coded signal in macroblock units.

Thereby, the shape signal corresponding to each macroblock can be obtained on the basis of the shape coded data included in the input coded signal Cstr. Consequently, the coding of the shape value is dispensed with and the low-cost and high-speed image coding process can be realized.

Figure 11:
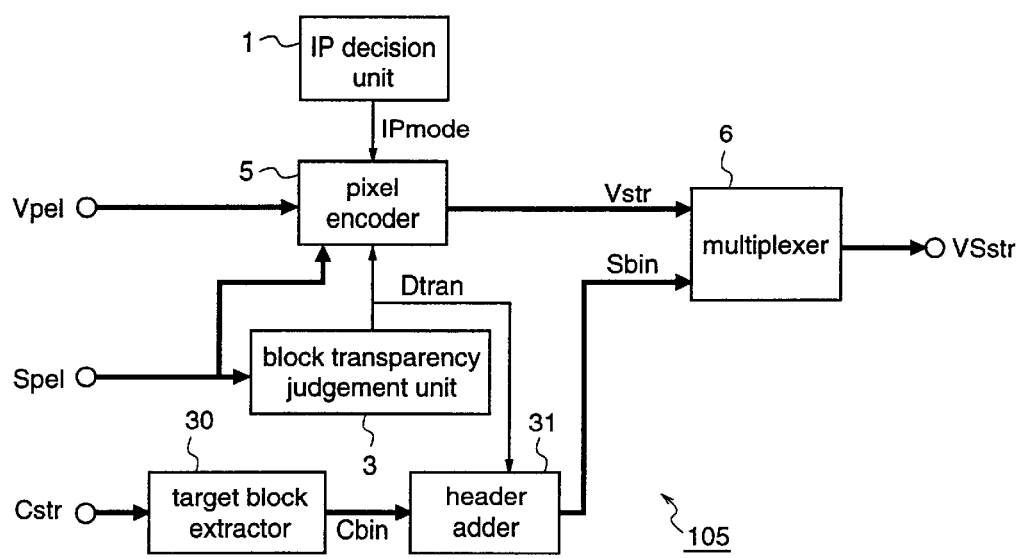
FIG. 11 is a block diagram for explaining the image coding apparatus according to the fifth embodiment.

FIG. 11 is a block diagram for explaining the image coding apparatus according to the fifth embodiment.

The image coding apparatus 105 of the fifth embodiment comprises an IP decision unit 1 for outputting a coding mode signal IPmode indicating which one of the intra-frame coding and inter-frame coding is to be performed to a target VOP, a block transparency judgement unit 3 for judging whether a target block to be coded requires the coding process on the basis of a shape value Spel indicating the shape of an object and outputting the result of the judgement as block transparency information Dtran for the target block, and a pixel encoder 5 for performing the coding of a pixel value Vpel on the basis of the block transparency information Dtran, the shape value Spel and the coding mode signal IPmode and outputting pixel coded data Vstr.

In this fifth embodiment, the coding mode signal for the shape does not change the coding mode.

The image coding apparatus 105 further comprises a target block extractor 30 for receiving a coded signal Cstr including the shape signal and the shape partition information which indicates the partition and extracting shape-related data Cbin from the coded signal Cstr for each macroblock on the basis of the shape partition information, a header adder 31 for performing a processing of adding information which cannot be generated by the extraction of data from the coded signal Cstr, such as the header of each macroblock, to the shape-related data Cbin corresponding to each macroblock, or a processing of rewriting the header or the like, and outputting shape coded data Sbin, and a multiplexer 6 for multiplexing the shape coded data Sbin and the pixel coded data Vstr and outputting a multiplex coded signal VSstr. Here, the IP decision unit 1, the block transparency judgement unit 3, the pixel encoder 5 and the multiplexer 6 have the same structures as those in the prior art image coding apparatus 200.

Next, the operation of the image coding apparatus 105 will be described.

The pixel value Vpel associated with the natural image or the like is input to the image coding apparatus 105 as video data. The previously prepared shape value Spel is input as the shape information and further the coded signal Cstr including the shape signal as coded data of the shape value Spel and the shape partition information which indicates partitioning positions of the shape signal is input to the image coding apparatus 105.

Then, in the block transparency judgement unit 3, the judgement as to whether the target block in the target VOP is a block outside the object is made on the basis of the shape value Spel and the block transparency information Dtran indicating the result of the judgement is output for each block.

In the target block extractor 30, the processing of extracting the shape-related data Cbin from the coded signal Cstr for each macroblock is performed on the basis of the shape partition information included in the coded signal Cstr. Further, in the header adder 31, the processing of adding the header of each macroblock or the like to the shape-related data Cbin associated with each macroblock or rewriting the header is performed on the basis of the block transparency information Dtran, and the shape coded data Sbin are output.

In the pixel encoder 5, the coding of the pixel value Vpel is performed for each block on the basis of the shape value Spel, the block transparency information Dtran and the coding mode signal IPmode, and the pixel coded data Vstr are output.

Then, in the multiplexer 6, the shape coded data Sbin and the pixel coded data Vstr are multiplexed and then the multiplex coded signal VSstr is output.

When the unit of coding (macroblock) is located completely outside the object, there are some cases where no data can be extracted from the coded signal Cstr as the shape-related data Cbin. Therefore, the header adder 31 is notified of whether the macroblock is located completely outside the object or not by the block transparency information Dtran, and accordingly correct header information can be generated by the header adder 31.

As described above, in the image coding apparatus 105 according to the fifth embodiment, the target block extractor 30 for receiving the coded signal Cstr including the coded shape signal and the shape partition information indicating the partition and extracting the shape-related data Cbin for each macroblock from the coded signal Cstr on the basis the shape partition information is included, and the shape-related data Cbin of each macroblock are subjected to the addition or rewriting of the header or the like and the shape coded data Sbin are output. Therefore, the coding of the image signal having no shape information, such as the natural image, can be performed, with making the most of the features of MPEG4 principally executing the coding process in object units. In addition to these effects, the image signal can be easily coded without coding the shape value.

In this fifth embodiment, the shape signal included in the coded signal and the shape value Spel are input to the image coding apparatus as the shape information. However, the image coding apparatus which uses the shape information can receive only the shape signal included in the coded signal as the shape information and generate the shape value Spel by the decoding of the shape signal included in the coded signal. In this case, the capacity of the memory which contains the shape value Spel can be saved.

[Embodiment 6]

Figure 12:
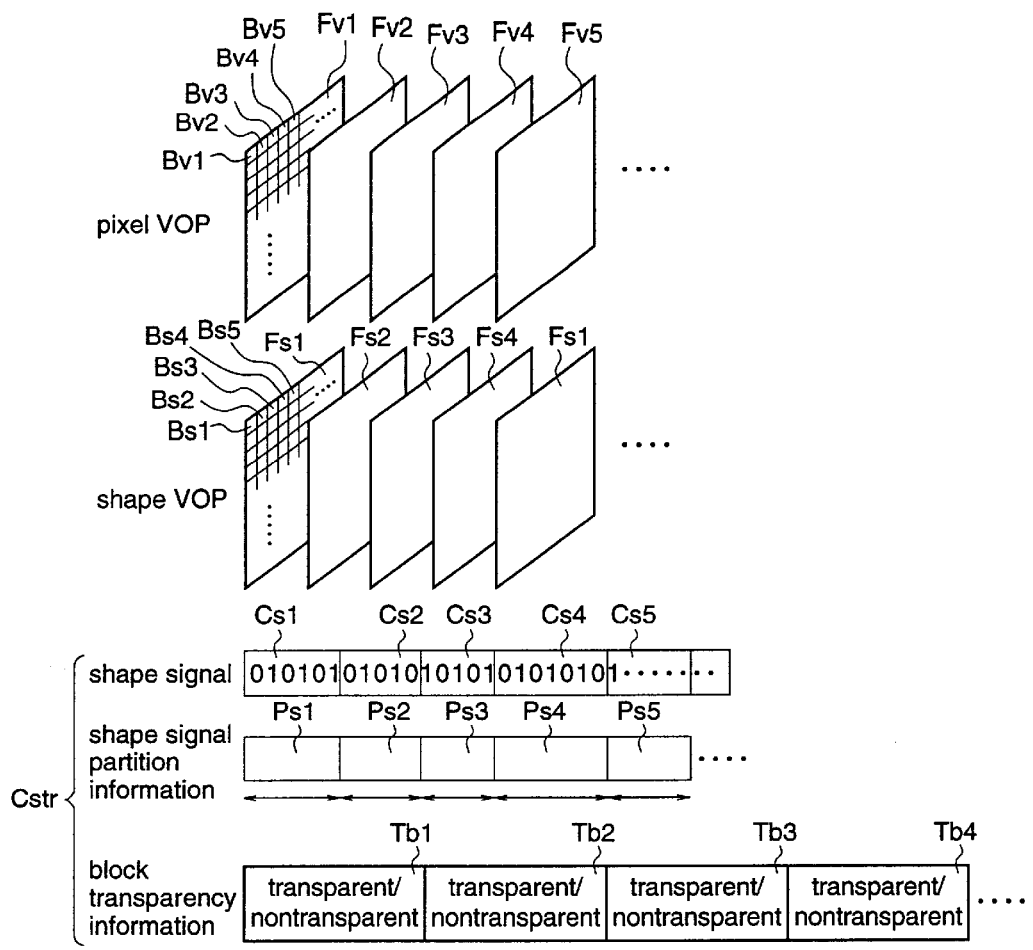
FIG. 12 is a diagram for explaining an image coding apparatus according to a sixth embodiment of the present invention, and shows information which is input to this image coding apparatus.

FIG. 12 is a diagram for explaining an image coding apparatus according to the sixth embodiment of the present invention, and shows information which is input to this image coding apparatus.

In the image coding apparatus 106 of the sixth embodiment, an input coded signal Cstr includes a shape signal Cs1, Cs2, Cs3, Cs4, Cs5, . . . , shape signal partition information Ps1, Ps2, Ps3, Ps4, Ps5, . . . , and block transparency information Tb1, Tb2, Tb3, Tb4, . . . , in place of the coded signal Cstr input to the image coding apparatus 105 of the fifth embodiment.

The block transparency information indicates whether each macroblock in a shape VOP is outside the object or not. When the input coded signal Cstr includes the block transparency information, the block transparency information can be extracted from the coded signal Cstr and accordingly the judgement as to the block transparency information on the basis of the shape value Spel can be dispensed with.

Figure 13:
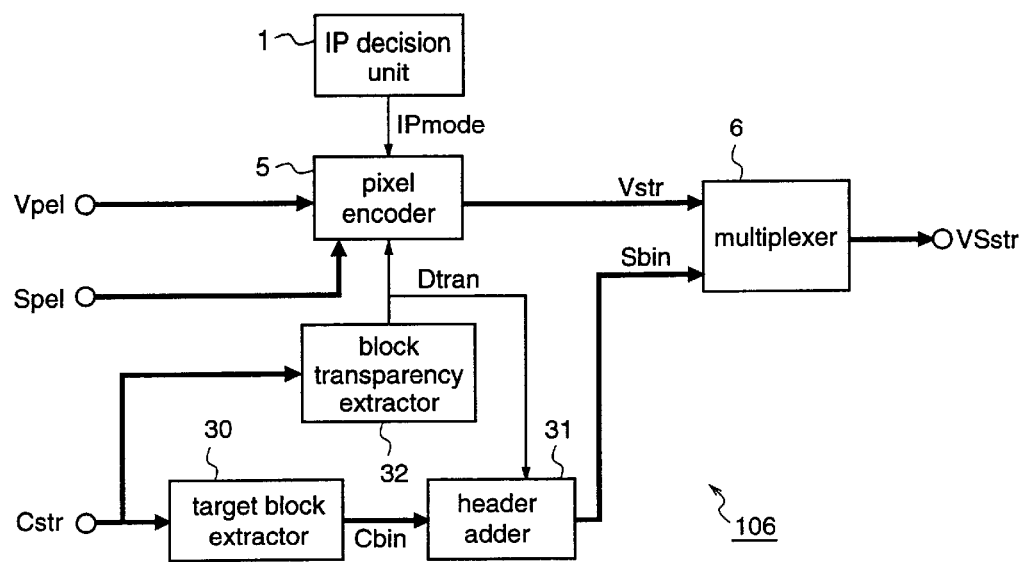
FIG. 13 is a block diagram for explaining the image coding apparatus according to the sixth embodiment.
Figure 14:
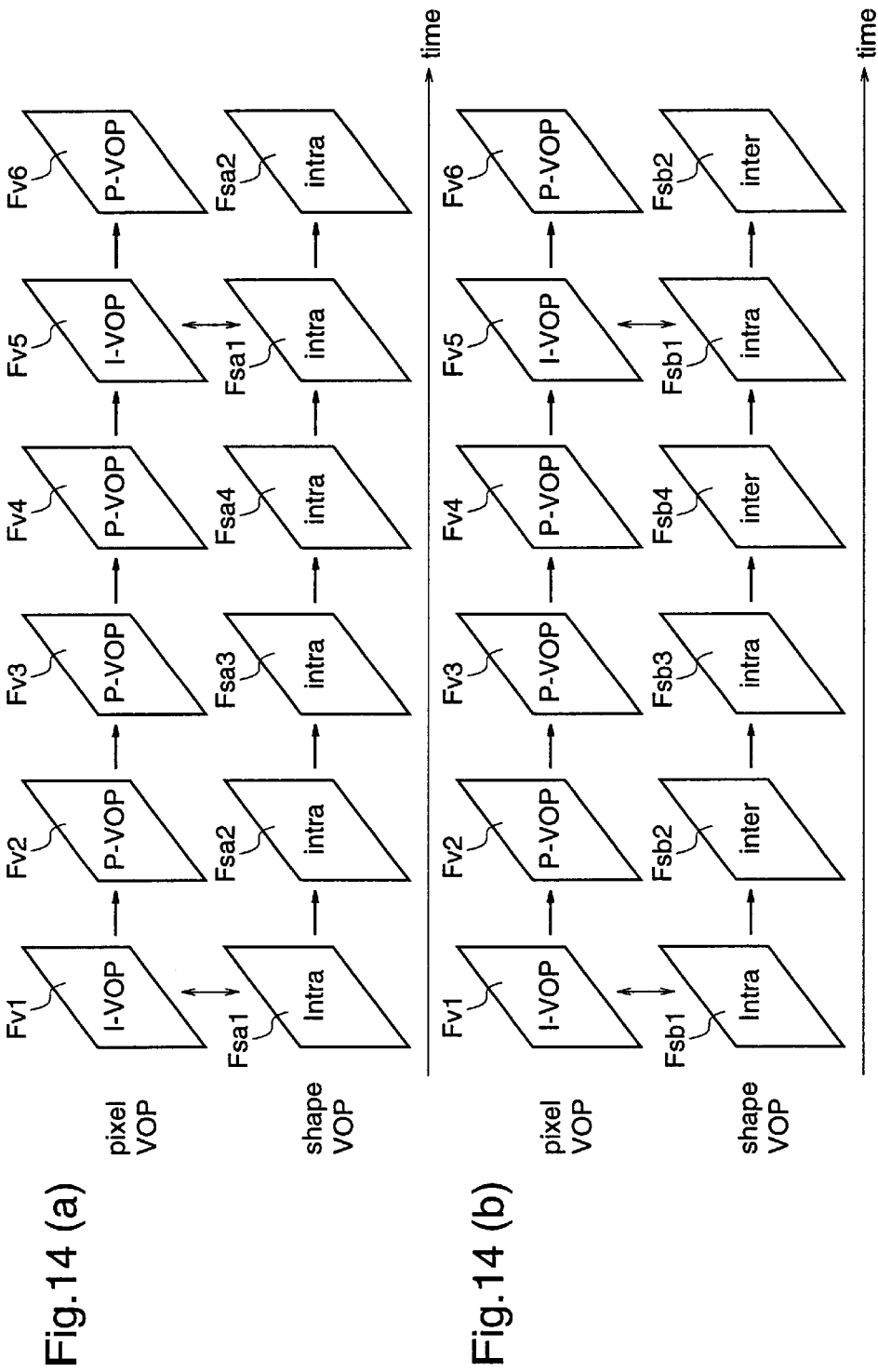
FIGS. 14(a) and 14(b) are diagrams for explaining an image coding method according to a seventh embodiment of the present invention, and show the correspondence between a pixel VOP and a shape VOP.

FIG. 13 is a block diagram for explaining the image coding apparatus according to the sixth embodiment.

The image coding apparatus 106 of the sixth embodiment comprises a block transparency extractor 32 for extracting block transparency information Dtran from the input coded signal Cstr and outputting the block transparency information Dtran, in place of the block transparency judgement unit 3 of the image coding apparatus 105 of the fifth embodiment. Other construction of the image coding apparatus 106 is identical to that of the image coding apparatus 105 of the fifth embodiment.

As described above, the image coding apparatus 106 of the sixth embodiment comprises the block transparency extractor 32 for extracting the block transparency information Dtran from the input coded signal Cstr and outputting the block transparency information, in addition to the target block extractor 30 for receiving the coded signal Cstr including the coded shape signal, the shape partition information indicating the partitioning positions, and the block transparency information for each block and extracting the shape-related data Cin from the coded signal Cstr for each macroblock on the basis of the shape partition information. Therefore, the coding of image signals having no shape information, such as the natural image, can be performed, with making the most of the features of MPEG4. In addition to these effects, not only the coding of the shape value, but also the judgement as to transparency degree for each block can be dispensed with, whereby the coding of the image signal can be performed more easily.

In this sixth embodiment, the image coding apparatus receives the shape signal included in the coded signal and the shape value Spel as the shape information. However, the image coding apparatus which uses the shape information can receive only the shape signal included in the coded signal as the shape information and generate the shape value Spel by decoding the shape signal included in the coded signal. In this case, the capacity of the memory which contains the shape value Spel can be saved. [Embodiment 7]

FIGS. 14(a) and 14(b) are diagrams for explaining an image coding method according to the seventh embodiment of the present invention, and show the correspondence between the pixel VOPs and the shape VOPs.

According to MPEG4, when the pixel VOP to be coded is an I-VOP and the intra-frame coding is performed for its pixel value, it is required that the shape VOP corresponding to the pixel VOP should be also an I-VOP and the intra-frame coding should be performed for its shape value.

Therefore, as shown in FIG. 14(a), when previously prepared shape coded data are obtained by subjecting shape values of all shape VOPs (Fsa1~Fsa4) to the intra-frame coding, the shape values obtained from the shape coded data can be utilized in the coding process of the pixel value for a target pixel VOP as in the sixth embodiment, whichever of the intra-frame coding or inter-frame coding is performed in the coding process. Accordingly, the coding of the shape value can be omitted.

However, as shown in FIG. 14(b), when the previously prepared shape coded data also include data which are obtained by subjecting the shape value to the inter-frame coding, the intra-frame coding should be performed to the pixel value of a pixel VOP corresponding to the shape VOP whose shape value has been subjected to the intra-frame coding. Here, the shape VOPs Fsb1 and Fsb3 are intra shape VOPs and the shape VOPs Fsb2 and Fsb4 are inter shape VOPs.

In this image coding method according to the seventh embodiment, the intra shape VOPs Fsb1 and Fsb3 whose shape values have been subjected to the intra-frame coding are detected, then pixel VOPs corresponding to these intra shape VOPs are assumed to be I-VOPs, and their pixel values are subjected to the intra-frame coding.

Hereinafter, a description is given of an image coding apparatus which performs the process in the image coding method according to the seventh embodiment.

Figure 15:
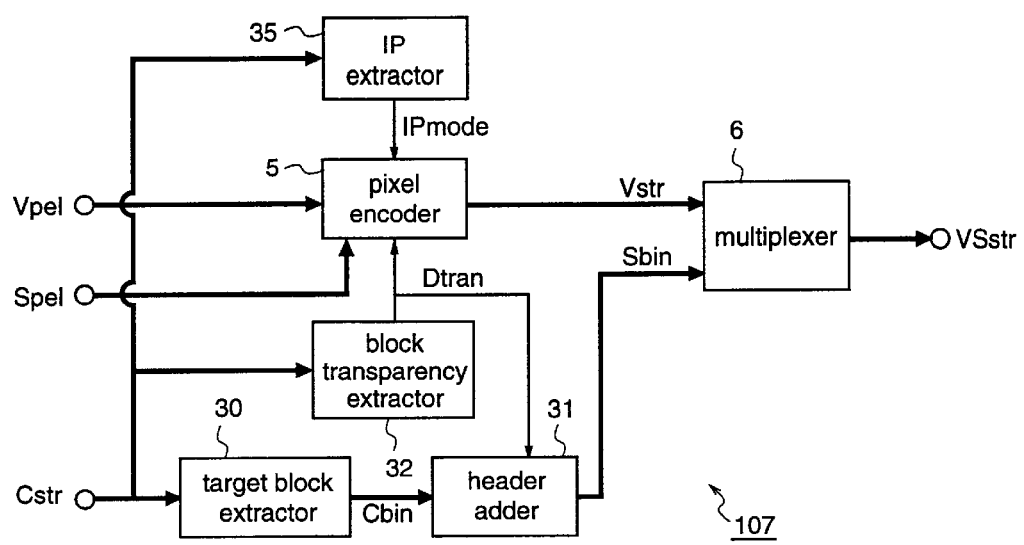
FIG. 15 is a block diagram for explaining an image coding apparatus according to the seventh embodiment.

FIG. 15 is a block diagram for explaining the image coding apparatus of the seventh embodiment.

The image coding apparatus 107 of the seventh embodiment comprises an IP extractor 35 for detecting whether a target shape VOP to be coded is an intra shape VOP whose shape values are all subjected to the intra-frame coding on the basis of the input coded signal Cstr, in place of the IP decision unit 1 in the image coding apparatus 106 of the sixth embodiment (see FIG. 13). The IP extractor 35 outputs a command signal IPmode for assuming the target pixel VOP to be coded is an I-VOP when the target shape VOP is an intra shape VOP and instructing to perform the intra-frame coding of the pixel value, and assuming the target pixel VOP to be coded is an I-VBP or P-VOP on the basis of other parameters when the target shape VOP is not an intra shape VOP and instructing to perform the coding of the pixel value.

Next, the operation of the image coding apparatus 107 will be described.

The operation of the image coding apparatus 107 according to the seventh embodiment is different from that of the image coding apparatus 106 according to the sixth embodiment only in that the command signal IPmode is output by the IP extractor 35.

To be specific, according to the seventh embodiment, the IP extractor 35 detects whether the target shape VOP to be coded is an intra shape VOP or not, on the basis of the input coded signal Cstr. Then, when the target shape VOP is an intra shape VOP, the command signal IPmode for assuming the target pixel VOP to be coded is an I-VOP and instructing to perform the intra-frame coding of the pixel value is output. On the other hand, when the target shape VOP is not an intra shape VOP, the command signal IPmode for assuming the target pixel VOP to be coded is an I-VOP or P-VOP on the basis of other parameters and instructing to perform the coding of the pixel value is output by the IP extractor 35.

As described above, the image coding apparatus 107 of the seventh embodiment comprises the IP extractor 35 for detecting whether the target shape VOP to be coded is an intra shape VOP or not on the basis of the input coded signal Cstr, in place of the IP decision unit 1 in the image coding apparatus 106 of the sixth embodiment. Therefore, the intra-frame coding can be securely performed to the pixel value of the pixel VOP corresponding to the intra shape VOP, and the cases where the previously prepared shape coded data include also the data whose shape values have been subjected to the inter-frame coding can be coped with by the extremely simple method.

[Embodiment 8]

Figure 16:
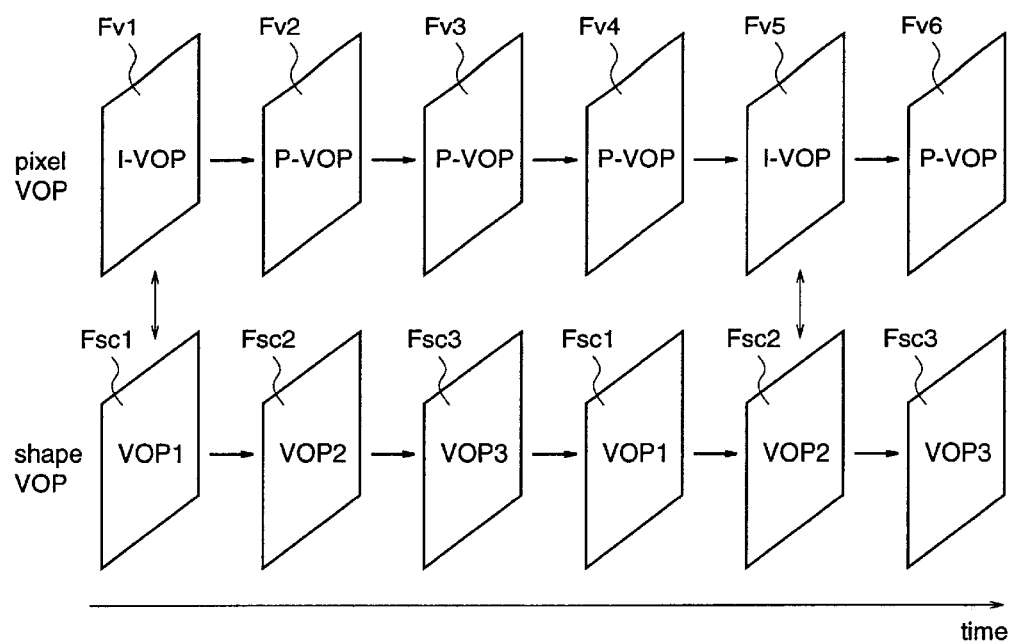
FIG. 16 is a diagram for explaining an image coding method according to an eighth embodiment of the present invention, and shows the correspondence between a pixel VOP and a shape VOP.

FIG. 16 is a diagram for explaining an image coding method according to the eighth embodiment of the present invention, and shows the correspondence between the pixel VOPs and the shape VOPs.

In the aforementioned seventh embodiment, it is decided which one of the intra-frame coding and the inter-frame coding is to be performed to a pixel VOP corresponding to a shape VOP according to whether the shape VOP whose shape coded data are previously prepared is an intra shape VOP or inter shape VOP. However, whether a shape signal included in an input coded signal or shape coded data obtained by coding an input shape value is to be used as shape coded data of a shape VOP corresponding to a target pixel VOP can be decided according to whether the target pixel VOP to be coded is assumed to be an I-VOP or P-VOP.

To be more specific, when the target pixel VOP is an I-VOP and a shape VOP corresponding to the target pixel VOP is not an intra shape VOP, the shape coded data which are obtained by subjecting the shape value to the intra-frame coding are used. In other cases, the shape signal included in the input coded signal is used as the shape coded data.

In these cases, as shown in FIG. 16, the cycle of the pixel I-VOP (4 VOPs in this figure) can be selected independently of the cycle of the shape VOPs (3 VOPs in this figure), and then the coding process can be performed to the pixel value to output the pixel coded data.

Figure 17:
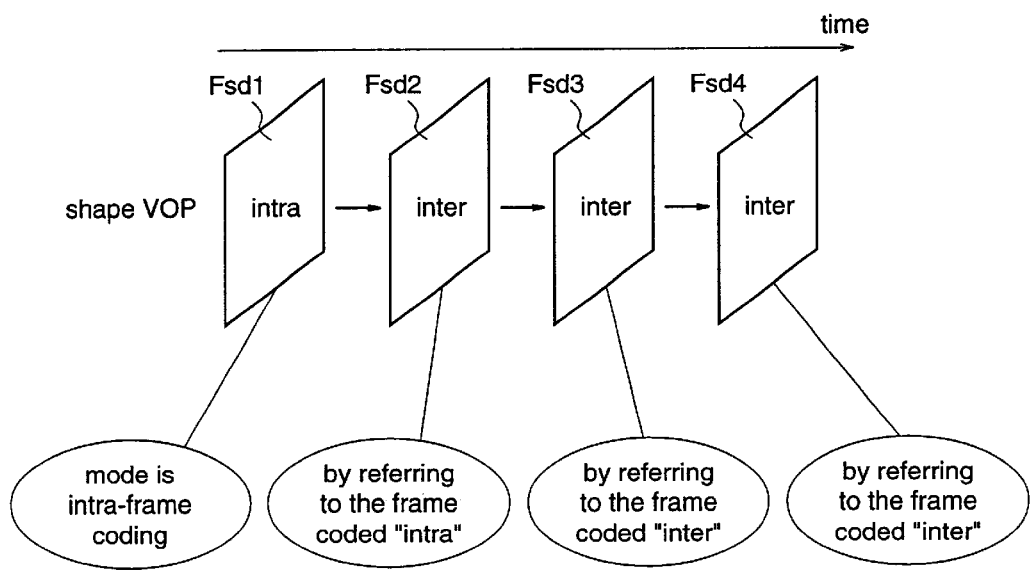
FIG. 17 is a diagram for explaining coding of a shape value according to MPEG4, and shows how a coding mode signal in MPEG4 is coded.

FIG. 17 is a diagram for explaining the coding of a shape value according to MPEG4, and shows how a coding mode signal in MPEG4 is coded. Here, the coding mode signal indicates a coding mode for distinguishing a shape VOP between an intra shape VOP and an inter shape VOP.

In MPEG4, the coding mode of the shape VOP which has been subjected to the inter-frame coding depends on the coding mode of the shape VOP which has previously been subjected to the coding process.

Therefore, for an inter shape VOP subsequent to an intra shape VOP which has been subjected to the intra-frame coding, the inter-frame coding is performed with reference to the coding mode signal which has been subjected to the intra-frame coding. Further, for an inter shape VOP subsequent to this inter shape VOP, the inter-frame coding is performed with reference to the coding mode signal which has been subjected to the inter-frame coding.

Here, assume that all of the shape signals included in the input coded signal correspond to the inter shape VOP subjected to the inter-frame coding. Since the pixel VOP is an intra shape VOP, when the shape value of the corresponding shape VOP is subjected to the intra-frame coding, there is a risk that the shape signal extracted directly from the input coded signal cannot be utilized as the shape coded data of an inter shape VOP subsequent to the intra shape VOP. Accordingly, there are some cases where the intra-frame coding and the inter-frame coding of the shape value must be performed to the intra shape VOP and the subsequent inter shape VOP.

Figure 18:
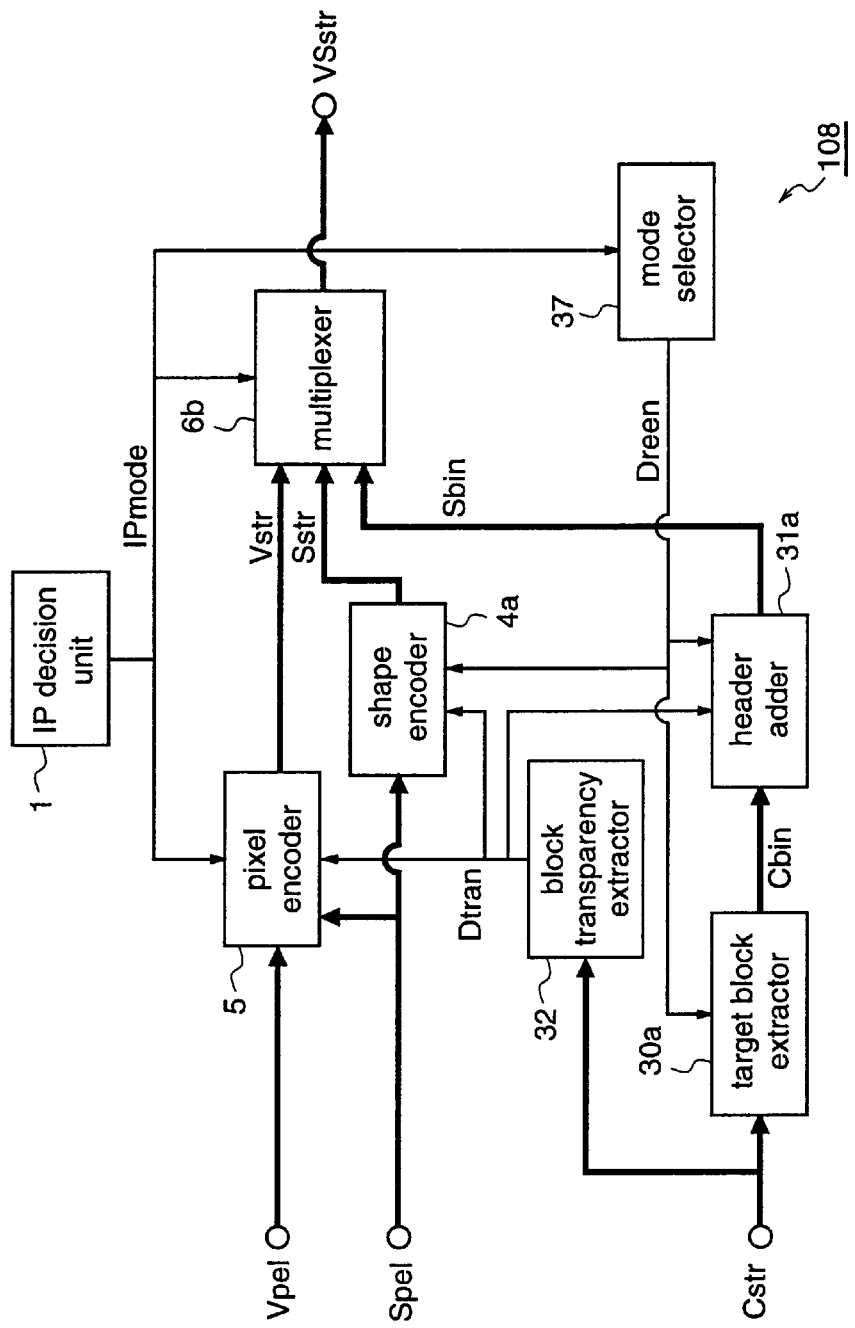
FIG. 18 is a block diagram for explaining an image coding apparatus according to the eighth embodiment.

FIG. 18 is a block diagram for explaining an image coding apparatus according to the eighth embodiment of the present invention.

Here, assume that the coded signal to be input Cstr includes shape coded data obtained by the inter-frame coding for the shape values, all of which data correspond to the inter shape VOP, as the shape information.

The image coding apparatus 108 according to the eighth embodiment comprises an IP decision unit 1 for outputting a coding mode signal IPmode indicating which coding process is to be performed to a target VOP, a block transparency extractor 32 for extracting block transparency information Dtran from an input coded signal Cstr and outputting the block transparency information Dtran, and a mode selector 37 for detecting a pixel I-VOP on the basis of the coding mode signal IPmode, and outputting a shape coding instruction signal Dreen indicating that it is necessary to code a shape value of a shape VOP corresponding to this pixel VOP and generate shape coded data.

The image coding apparatus 108 further comprises a pixel encoder 5 for performing a coding process for a pixel value Vpel on the basis of the block transparency information Dtran, the shape value Spel and the coding mode signal IPmode and outputting pixel coded data Vstr, and a shape encoder 4a for performing a coding process for the shape value Spel on the basis of the block transparency information Dtran and the shape coding instruction signal Dreen and outputting shape coded data Sstr.

The image coding apparatus 108 further comprises a target block extractor 30a for receiving the coded signal Cstr and extracting shape-related data Cbin for each macroblock from the coded signal Cstr on the basis of the shape coding instruction signal Dreen, a header adder 31a for performing a processing of adding information such as the header of each macroblock, which cannot be generated only by the extraction of data from the coded signal Cstr, to the shape-related data Cin of each macroblock, or a processing of rewriting the header or the like, on the basis of the shape coding instruction signal Dreen and outputting shape coded data Sbin, and a multiplexer 6b for selecting one of the shape coded data Sbin and Sstr in accordance with the coding mode signal IPmode, multiplexing the selected shape coded data and the pixel coded data Vstr, and outputting a multiplex coded signal VSstr.

Here, the IP decision unit 1 and the pixel encoder 5 have the same structures as those in the prior art image coding apparatus 200. The block transparency extractor 32 has the same structure as that in the seventh embodiment.

Next, the operation of the image coding apparatus 108 will be described.

The pixel value Vpel corresponding to the natural image or the like is input as video data to the image coding apparatus 108. Further, the previously prepared shape value Spel and the coded signal Cstr which includes a shape signal as coded data of the shape value Spel and shape partition information which indicates partitioning positions of the shape signal are input as the shape information.

Then, in the IP decision unit 1, whether a target VOP to be coded is assumed to be a VOP subjected to the intra-frame coding (I-VOP) or VOP subjected to the inter-frame coding (P-VOP) is decided, and a coding mode signal IPmode indicating which one of the intra-frame coding and inter-frame coding is to be performed for the target VOP is output.

In the mode selector 37, a pixel I-VOP is detected on the basis of the coding mode signal IPmode, and the shape coding instruction signal Dreen indicating that it is necessary to code the shape value of a shape VOP corresponding to the pixel VOP and generate the shape coded data is output.

Then, in the block transparency extractor 32, the block transparency information Dtran indicating whether a shape block as a constituent of each shape VOP is outside the object or not is extracted from the input coded signal Cstr.

In the target block extractor 30a, the shape-related data Cbin for each macroblock are extracted from the coded signal Cstr on the basis of the shape coding instruction signal Dreen and the shape partition information included in the coded signal Cstr. In the header adder 31a, the processing of adding the header of each macroblock to the shape-related data Cbin of each macroblock, or rewriting the header or the like, on the basis of the shape coding instruction signal Dreen and the block transparency information Dtran is performed, and then the shape coded data Sbin are output.

In the pixel encoder 5, the coding of the pixel value Vpel is performed for each block on the basis of the shape value Spel, the block transparency information Dtran and the coding mode signal IPmode. In the shape encoder 4a, the coding of the shape value Spel is performed on the basis of the block transparency information Dtran and the shape coding instruction signal Dreen, and the shape coded data Sstr are output.

Then, in the multiplexer 6b, one of the shape coded data Sbin and Sstr is selected in accordance with the coding mode signal IPmode, the selected shape coded data and the pixel coded data Vstr are multiplexed, and the multiplex coded signal VSstr is output.

When the unit of coding (macroblock) is located completely outside the object, there are some cases where no data can be extracted from the coded signal Cstr as the shape-related data Cbin. Therefore, the header adder 31a is informed of whether the macroblock is located completely outside the object or not, using the block transparency information Dtran. Accordingly, correct header information is generated by the header adder 31a.

As described above, the image coding apparatus according to the eighth embodiment comprises the mode selector 37 for detecting the pixel I-VOPs on the basis of the coding mode signal IPmode and outputting the shape coding instruction signal Dreen indicating that it is necessary to code the shape values of the shape VOPs corresponding to these pixel VOPs and generate the shape coded data, uses the shape coded data which are obtained by subjecting the shape value to the intra-frame coding when the target pixel VOP is an I-VOP, and uses the shape signal included in the input coded signal as the shape coded data in other cases. Therefore, the cases where the shape information included in the, input coded signal Cstr is shape coded data obtained by the inter-frame coding of, the shape values all of which data correspond to the inter shape VOP, can also be coped with.

In this eighth embodiment, the mode selector 37 detects the pixel I-VOP in accordance with the coding mode signal IPmode, and outputs the, shape coding instruction signal Dreen which indicates that it is necessary to code the shape value of the shape VOP corresponding to the pixel VOP and generate the shape coded data. However, the mode selector 37 can detect the pixel I-VOP and the subsequent pixel P-VOP on the basis of the coding mode signal IPmode and output the shape coding instruction signal Dreen which indicates that it is necessary to code the shape values of the shape VOPs corresponding to these pixel VOPs and generate the shape coded data. In this case, the coding efficiency can be further improved. [Embodiment 9]

FIGS. 19(a) and 19(b) are diagrams for explaining an image coding method according to the ninth embodiment of the present invention.

In the image coding method according to the ninth embodiment, when a shape VOP and the corresponding pixel VOP have different sizes, the size of the shape VOP is changed so as to match the size of the pixel VOP, and thereafter the same coding process as in the eighth embodiment is performed. Hereinafter, the image coding method of the ninth embodiment will be described in more detail. In this ninth embodiment, the shape VOP and the pixel VOP are used as the concepts of the bounding box (BBOX) in MPEG4. This BBOX is an image space which completely includes an object defined by the width, height and position of a VOP. The outside of the BBOX is an area outside the object.

When the size of the pixel VOP is different from the size of the shape VOP, there are some cases where no macroblock exists in the shape VOP corresponding to the macroblock (unit of coding) in the pixel VOP or no macroblock exists in the pixel VOP corresponding to the macroblock in the shape VOP.

In the former, as shown in FIG. 19(a), when the size of the shape VOP is extended in macroblock units and shape values corresponding to macroblocks in the extended part (diagonally shaded part) are assumed to be shape values associated with an area outside the object, the size of the shape VOP can be made equal to the size of the pixel VOP without affecting pixel values associated with an area inside the object.

In the latter, as shown in FIG. 19(b), the size of the shape VOP is reduced in macroblock units and an area having no corresponding pixel values in the shape VOP is eliminated. Thereby, the size of the shape VOP can be made equal to the size of the pixel VOP.

However, shape values associated with an area inside the object may be eliminated in some cases. Accordingly, there is a risk that the shape of the object is changed.

FIG. 20 is a diagram for explaining the coding process for the shape value according to MPEG4.

In MEPG4, as shown in FIG. 20, when a block Bx to be processed is subjected to the coding process, shape values of blocks Bra, Brb and Brc which are located adjacently on the upper, upper right and left sides of the block-to-be-processed Bx are referred to.

To be more specific, when the shape value of the upper block Bra or the shape value of the left block Brc is changed, the influences of the changes exert on the coding of the shape values associated with all blocks which are located on the lower side of the upper block or all blocks which are located on the right of the left block.

When the size of the shape VOP is changed as described above, in order to minimize the influences of the changes in the shape value of a reference block and make good use of the shape signal extracted from the input coded signal Cstr, blocks are eliminated beginning from the right end and lower end of the shape VOP and blocks on the upper end and left end of the shape VOP are not eliminated as long as possible, when the size of the shape VOP is to be reduced.

Figure 21:
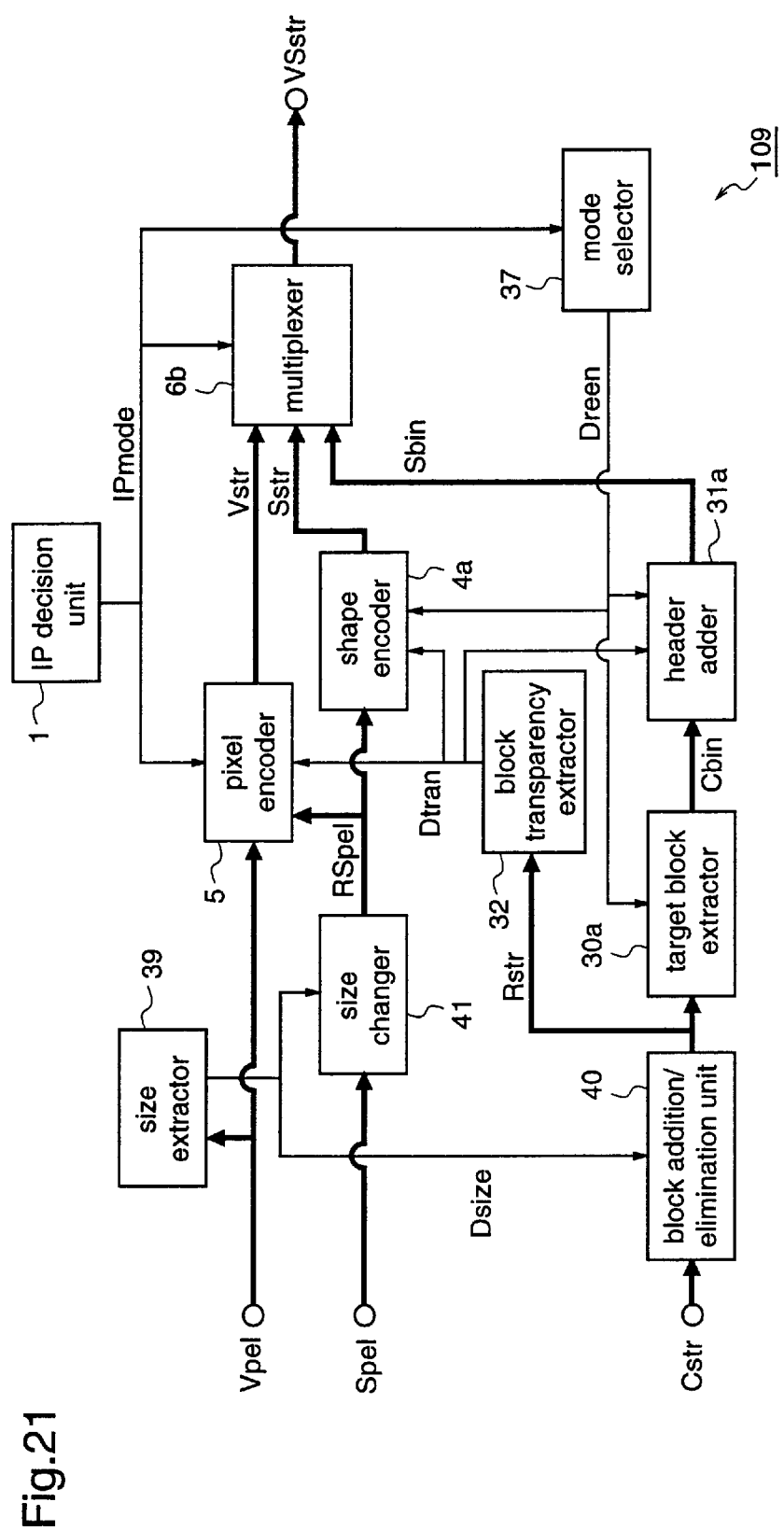
FIG. 21 is a block diagram for explaining an image coding apparatus according to the ninth embodiment.

FIG. 21 is a block diagram for explaining an image coding apparatus according to the ninth embodiment.

The image coding apparatus 109 according to the ninth embodiment has the structure of the image coding apparatus 108 of the eighth embodiment and further comprises a size extractor 39 for measuring the size of the pixel VOP on the basis of the pixel value Vpel and outputting a size signal Dsize indicating the size, a block addition/elimination unit 40 for subjecting a shape signal included in an input coded signal Cstr to a processing of adding or eliminating shape information in block units in accordance with the size signal Dsize so that the number of blocks in the shape VOP matches the size of the pixel VOP, and outputting a converted coded signal Rstr to the target block extractor 30a and the block transparency extractor 32, and a size changer 41 for subjecting the shape value Spel to a processing of adding or eliminating the shape values in block units in accordance with the size signal Dsize so that the size of the shape VOP matches the size of the pixel VOP, and outputting a converted shape value RSpel to the pixel encoder 5 and the shape encoder 4a.

Other construction of the image coding apparatus 109 of the ninth embodiment is identical to that of the image coding apparatus 108 of the eighth embodiment.

Next, the operation of the image coding apparatus 109 will be described.

In the image coding apparatus 109 of the ninth embodiment, the operations of the elements other than the size extractor 39, the block addition/elimination unit 40 and the size changer 41 are identical to those in the eighth embodiment. Hereinafter, only the operations relating to the size extractor 39, the block addition/elimination unit 40 and the size changer 41 are described.

When the pixel value Vpel is input to the image coding apparatus 109, the size extractor 39 measures the size of the pixel VOP and outputs the size signal Dsize indicating the size.

In the block addition/elimination unit 40, the processing of adding or eliminating the shape information in block units is performed to the shape signal included in the input coded signal Cstr in accordance with the size signal Dsize so that the number of blocks in the shape VOP matches the size of the pixel VOP, and then the converted coded signal Rstr is output to the target block extractor 30a and the block transparency extractor 32.

Further, in the size changer 41, the processing of adding or eliminating the shape value in block units is performed to the shape value Spel in accordance with the size signal Dsize so that the size of the shape VOP matches the size of the pixel VOP, and the converted shape value RSpel is output to the pixel encoder 5 and the shape encoder 4a.

Then, in the block transparency extractor 32, the block transparency information Dtran indicating whether the shape block as a constituent of each shape VOP is outside the object or not is extracted from the converted coded signal Rstr. In the target block extractor 30a, the processing of extracting the shape-related data Cbin from the converted coded signal Rstr for each macroblock is performed on the basis of the shape coding instruction signal Dreen and the shape partition information included in the converted coded signal Rstr. Further, in the header adder 31a, the processing of adding the header of each macroblock to the shape-related data Cbin of each macroblock or rewriting the header or the like is performed on the basis of the shape coding instruction signal Dreen and the block transparency information Dtran, and then the shape coded data Sbin are output.

In the pixel encoder 5, the coding process for the pixel value Vpel is performed for each block on the basis of the converted shape value RSpel, the block transparency information Dtran and the coding mode signal IPmode, and then the pixel coded data Vstr are output. Further, in the shape encoder 4a, the coding process for the converted shape value RSpel is performed on the basis of the block transparency information Dtran and the shape coding instruction signal Dreen, and the shape coded data Sstr are output.

Then, in the multiplexer 6b, one of the shape coded data Sbin and Sstr is selected on the basis of the coding mode signal IPmode, the selected shape coded data and the pixel coded data Vstr are multiplexed, and the multiplex coded signal VSstr is output.

As described above, in the ninth embodiment, the processing of adding or eliminating the shape information in block units is performed to the shape signal included in the coded signal Cstr so that the size of the shape VOP matches the size of the pixel VoP, as well as the processing of adding or eliminating the shape values in block units being performed to the shape value Spel. Therefore, also when the size of the pixel VOP is different from the size of the shape VOP, the coding of the image signal having no shape information can be performed in object units, with using the shape value independent of the image signal.

Further, when the block in the shape VOP whose shape information is to be eliminated is a block located on the lower end of the shape VOP, or the block whose shape information is to be eliminated is a block outside the object, even when the shape information of these blocks is eliminated, the shape information for the remaining blocks are not changed. Accordingly, the shape signal which is extracted from the coded signal can be used as it is as the shape information associated with the shape VOP having a changed size. Consequently, even when the size of the pixel VOP does not match the size of the shape VOP, the coding of the shape value can be omitted and the high-speed image coding can be realized.

In this ninth embodiment, when the size of the shape VOP is different from the size of the pixel VOP, the size of the shape VOP is changed so as to match the size of the pixel VOP. However, the size of the pixel VOP can be changed so as to match the size of the shape VOP.

[Embodiment 10]

Figure 22:
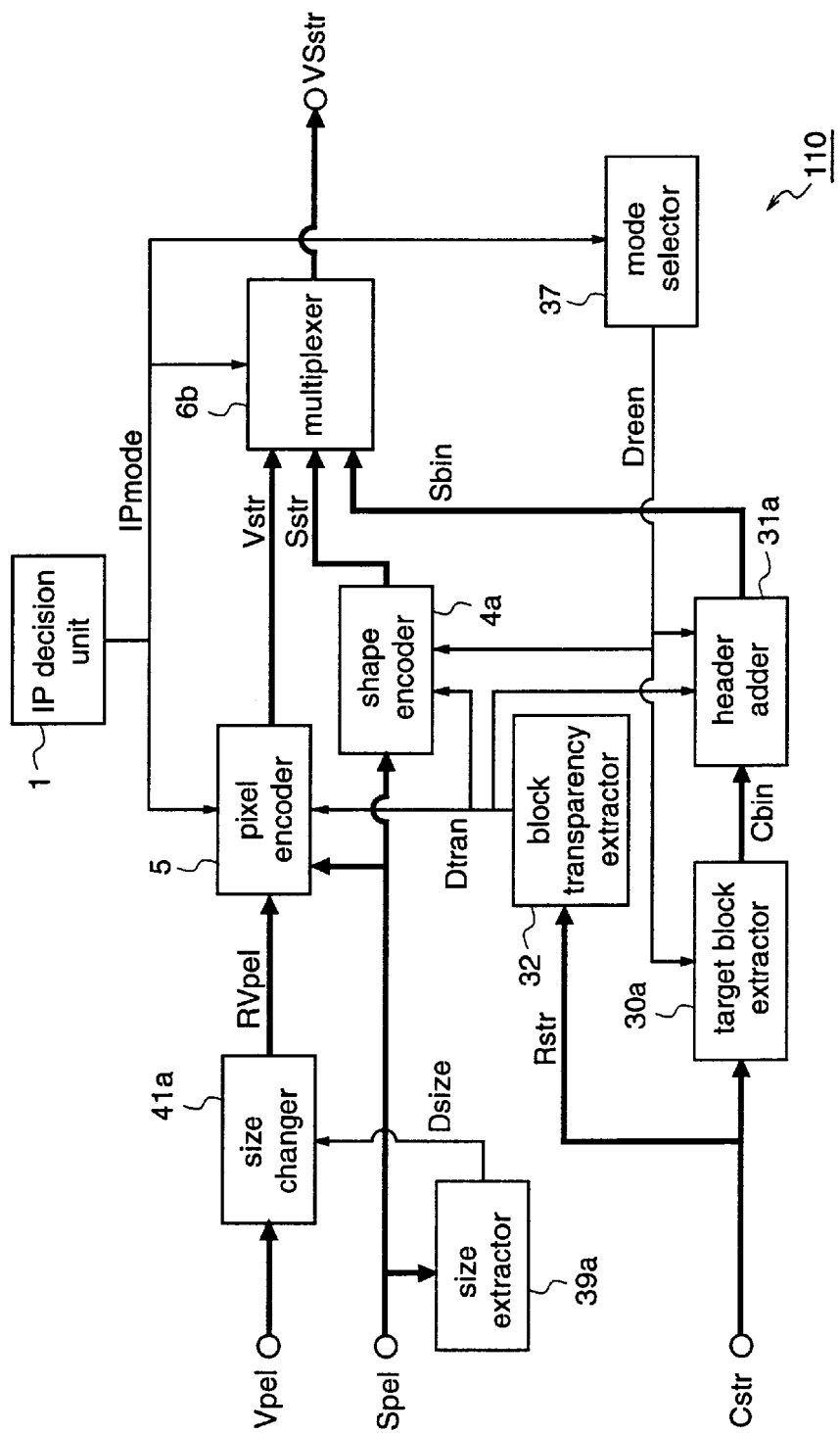
FIG. 22 is a block diagram for explaining an image coding apparatus according to a tenth embodiment of the present invention.
Figure 23:
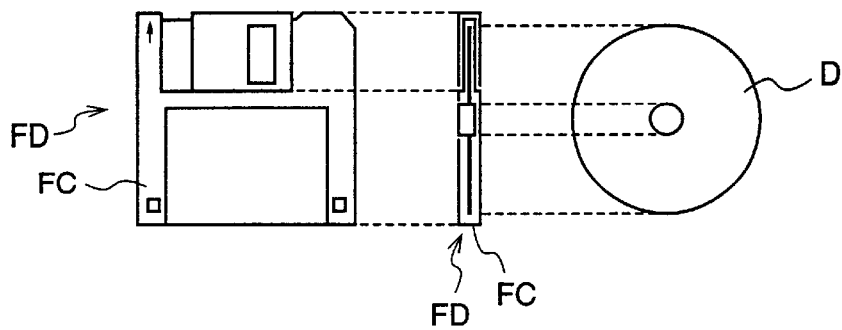
FIGS. 23(a) and 23(b) are diagrams for explaining a data storage medium which contains a program for implementing the image coding process according to any of the aforementioned embodiments by a computer system.
FIG. 23(c) is a diagram for explaining this computer system.
Figure 23:
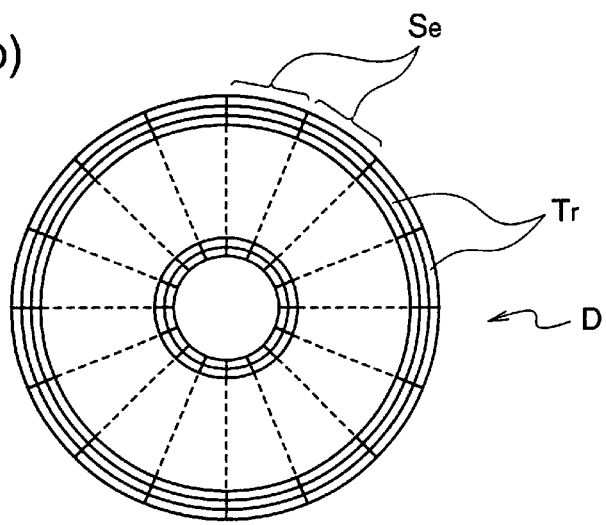
Figure 23:
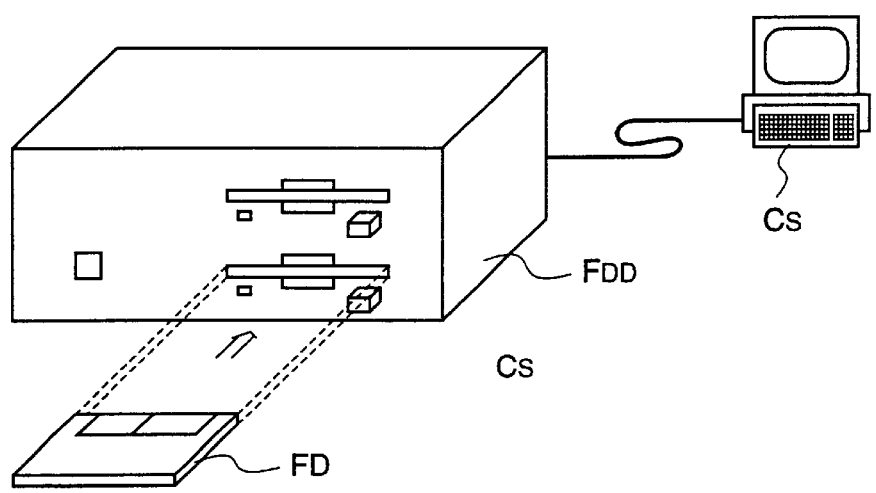
Figure 24:
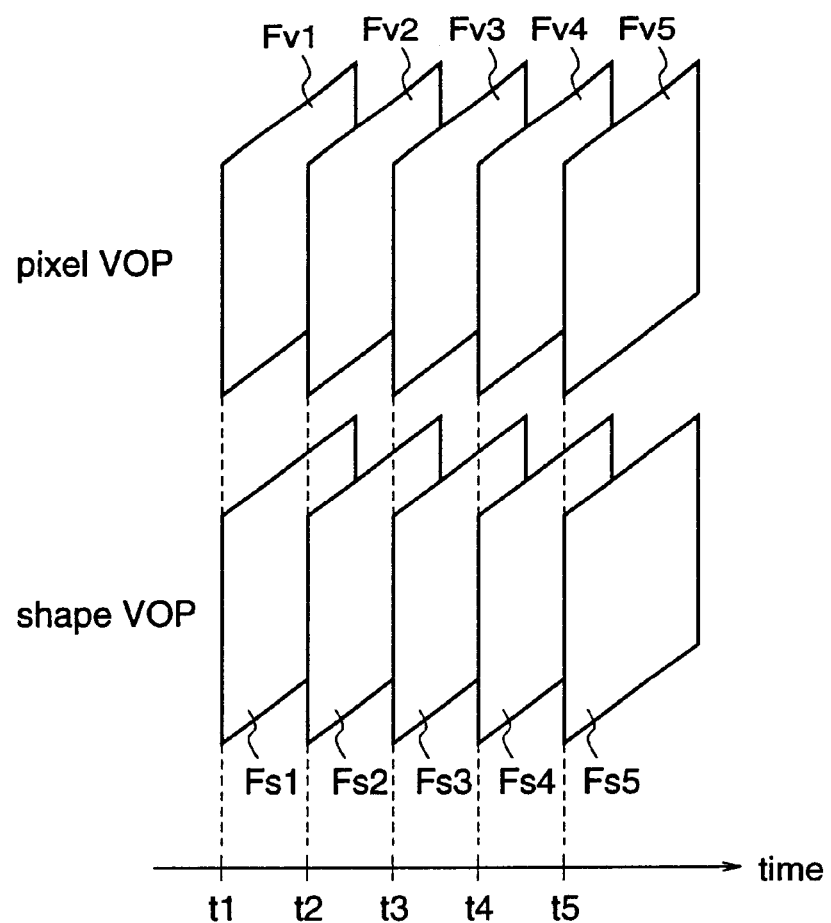
FIG. 24 is a diagram showing the display times of a pixel VOP and a shape VOP which are obtained from an image signal having a shape.
Figure 25:
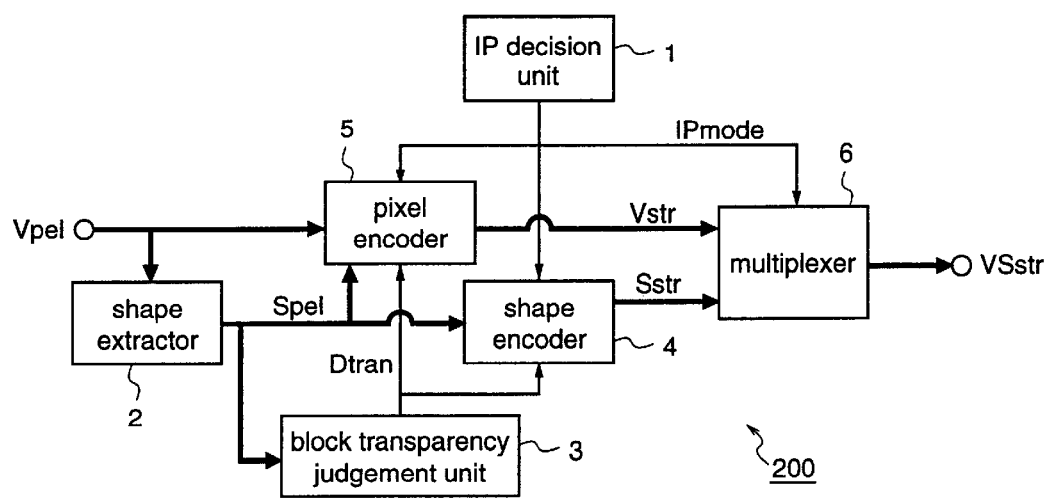
FIG. 25 is a block diagram for explaining a prior art image coding apparatus which conforms to MPEG4.

FIG. 22 is a block diagram for explaining an image coding apparatus according to the tenth embodiment of the present invention.

When the size of a shape VOP is different from the size of the corresponding pixel VOP, the image coding apparatus 110 according to the tenth embodiment changes the size of the pixel VOP so as to match the size of the shape VOP, and thereafter performs the same coding process as in the eighth embodiment. Also in this tenth embodiment, the shape VOP and the pixel VOP are used as the concepts of the bounding box (BBOX) in MPEG4, as in the ninth embodiment.

The image coding apparatus 110 according to the tenth embodiment has the structure of the image coding apparatus 108 of the eighth embodiment and further comprises a size extractor 39a for measuring the size of the shape VOP on the basis of the shape value Spel and outputting the size signal Dsize indicating the size, and a size changer 41a for performing the processing of adding or eliminating pixel values in block units to the pixel value Vpel in accordance with the size signal Dsize so that the size of the pixel VOP matches the size of the shape VOP, and outputting a converted pixel value RVpel to the pixel encoder 5.

Other construction of the image coding apparatus 110 according to the tenth embodiment is identical to the image coding apparatus 108 of the eighth embodiment.

Next, the operation of the image coding apparatus 110 will be described.

In the image coding apparatus 110 of the tenth embodiment, the operations of the elements other than the size extractor 39a and the size changer 41a are identical to those in the eighth embodiment. Therefore, only the operations relating to the size extractor 39a and the size changer 41a will be hereinafter described.

When the shape value Spel is input to the image coding apparatus 110, the size extractor 39a measures the size of the shape VOP and outputs the size signal Dsize indicating the size.

In the size changer 41a, the processing of adding or eliminating the pixel values in block units is performed to the pixel value Vpel in accordance with the size signal Dsize so that the size of the pixel VOP matches the size of the shape VOP, and the converted pixel value RVpel is output to the pixel encoder 5.

Other operation is performed in the same way as in the image coding apparatus 108 of the eighth embodiment.

As described above, in this tenth embodiment, the processing of adding or eliminating the pixel value in block units is performed to the pixel value Vpel so that the size of the pixel VOP matches the size of the shape VOP. Therefore, also when the size of the pixel VOP is different from the size of the shape VOP, the coding of the image signal having no shape in formation can be performed in object units, with using the shape value independent of the image signal.

In the ninth and tenth embodiments, when the size of the shape VOP does not match the size of the pixel VOP, one of the shape VOP and the pixel VOP is reduced or extended. However, the method for matching the size of the shape VOP with the size of the pixel VOP is not restricted to this.

For example, the structures according to the ninth and tenth embodiments can be combined, whereby when the size of the shape VOP does not match the size of the pixel VOP, one of the shape VOP and the pixel VOP having a larger size can be reduced. Or, one of the shape VOP and the pixel VOP having a smaller size can be extended.

[Embodiment 11]

When a program for implementing the image coding apparatus according to any of the aforementioned embodiments by software is recorded in a storage medium, such as a floppy disk, the image coding process according to any of the aforementioned embodiments can be easily realized in an independent computer system.

FIGS. 23(a) and 23(b) are diagrams for explaining the data storage medium which contains the program for implementing the image coding apparatus according to any of the aforementioned embodiments by a computer system. FIG. 23(c) is a diagram for explaining the computer system.

FIG. 23(a) shows a front view of a floppy disk FD, a cross-sectional view thereof, and a floppy disk body D. FIG. 23(b) shows an example of a physical format of the floppy disk body D as the storage medium.

The floppy disk FD is composed of the floppy disk body D and a case FC which contains the floppy disk body D. On the surface of the disk body D, a plurality of tracks Tr are formed concentrically from the outer circumference of the disk toward the inner circumference. Each track is divided into 16 sectors (Se) in the angular direction. Therefore, in the floppy disk FD containing the abovementioned program, data of image processing program for implementing the process in the image coding method according to any of the aforementioned embodiments by the computer are recorded in the assigned sectors on the floppy disk body D.

FIG. 23(c) shows the structure for recording or reproducing the program in or from the floppy disk FD. To be specific, when the program is to be recorded in the floppy disk FD, data of the image processing program are written in the floppy disk FD from the computer system Cs through the floppy disk drive FDD. When the above-mentioned image coding apparatus is constructed in the computer system Cs by the program recorded in the floppy disk FD, the image processing program is read from the floppy disk FD by the floppy disk drive FDD and then loaded to the computer system Cs.

Although in the above description a floppy disk is employed as a data storage medium, an optical disk may be employed in place of the floppy disk. Also in this case, the image coding apparatus according to any of the aforementioned embodiments can be realized by the computer system in the same manner as the case of using the floppy disk. The data storage medium is not restricted to these disks, and any medium may be employed as long as it can contain the program, for example, an IC card or a ROM cassette.

What is claimed is:

1. An image coding method for coding pixel information which is included in an image signal of an image to be reproduced and forms a design of the image on a pixel frame, on the basis of shape information indicating an arbitrary shape on a shape frame, the image coding method comprising:

a pixel coding process of coding pixel information, which forms a design of an area in the image, corresponding to a prescribed shape on the basis of predetermined shape information used as the shape information, which has been previously generated independently of the pixel information included in the image signal and indicates the prescribed shape on a predetermined shape frame; and a multiplexing process of generating coded data which include pixel coded data obtained by the coding of the pixel information and shape coded data corresponding to the predetermined shape information.

2. The image coding method of claim 1, wherein the pixel coding process is carried out such that, on the basis of decoded shape information used as the shape information, which is obtained by decoding the shape coded data corresponding to the predetermined shape information which has been previously generated independently of the pixel information included in the image signal and indicates the prescribed shape on the predetermined shape frame, pixel information which forms a design of an area in the image corresponding to the decoded shape information is coded.

3. The image coding method of claim 1, further comprising a shape coding process of coding the predetermined shape information used as the shape information, which has been previously generated independently of the pixel information included in the image signal and indicates the prescribed shape on the predetermined shape frame, wherein the multiplexing process is carried out such that the coded data which include the shape coded data obtained by the coding of the predetermined shape information and the pixel coded data obtained by the coding of the pixel information are generated.

4. The image coding method of claim 1, wherein decoded shape information which is obtained by decoding the shape coded data corresponding to the predetermined shape information which has been previously generated independently of the pixel information included in the image signal and indicates the prescribed shape on the predetermined shape frame is used as the shape information, the image coding method further comprises a shape coding process of coding the predetermined decoded shape information, the pixel coding process is carried out such that pixel information, which forms a design of an area in the image, corresponding to the decoded shape information is coded on the basis of the predetermined decoded shape information, and the multiplexing process is carried out such that coded data which include shape coded data obtained by coding of the predetermined decoded shape information and the pixel coded data obtained by the coding of the pixel information are generated.

5. The image coding method of claim 1, wherein the pixel coding process is carried out such that shape information corresponding to a prescribed number of predetermined shape frames is used as the predetermined shape information, and the prescribed number of the predetermined shape frames are repeatedly allocated to plural pixel frames which are more than the number of the predetermined shape frames, and pixel information corresponding to the plural pixel frames is coded on the basis of the shape information corresponding to the predetermined shape frames.

6. The image coding method of claim 1, wherein the pixel coding process is carried out such that shape information corresponding to a prescribed number of predetermined shape frames is used as the predetermined shape information, and the prescribed number of the predetermined shape frames are repeatedly allocated to plural pixel frames which are more than the number of the predetermined shape frames, in an order of the predetermined shape frames, and pixel information corresponding to the plural pixel frames is coded on the basis of the shape information corresponding to the predetermined shape frames.

7. The image coding method of claim 1, wherein the pixel coding process is carried out such that shape information corresponding to a prescribed number of predetermined shape frames is used as the predetermined shape information, and a predetermined shape frame depending on time information which is set for each pixel frame is allocated to each of plural pixel frames which are more than the number of the predetermined shape frames, and pixel information corresponding to the plural pixel frames is coded on the basis of the shape information corresponding to the predetermined shape frames.

8. The image coding method of claim 1, wherein the predetermined shape information includes shape coded data which are obtained by previously coding shape values forming the predetermined shape frame, for each of given unit areas partitioning the predetermined shape frame, by a method which is suitable for a coding process of the pixel information.

9. The image coding method of claim 1, wherein shape values forming the predetermined shape frame and first shape coded data which are obtained by previously coding the shape values by a method which is suitable of a coding process for the pixel information are used as the predetermined shape information, the image coding method further comprises a shape coding process of coding the shape values forming the predetermined shape frame, as needed, by a method according to a method of a coding process for a pixel frame corresponding to the predetermined shape frame to generate second shape coded data, and the multiplexing process is carried out such that a suitable stream part in the first shape coded data, the suitable stream part corresponding to a predetermined shape frame which conforms to a method for coding a pixel frame, and the pixel coded data are multiplexed, and an unsuitable stream part in the first shape coded data, the unsuitable stream part corresponding to a predetermined shape frame which does not conform to the method of coding the pixel frame is replaced with a corresponding stream part in the second shape coded data, and the corresponding stream part and the pixel coded data are multiplexed.

10. The image coding method of claim 9, wherein the first shape coded data are obtained by subjecting all of the shape values forming the predetermined shape frame to intra-frame coding.

11. The image coding method of claim 8, wherein in addition to the shape coded data, the predetermined shape information includes:

partition data for distinguishing partitions of stream parts corresponding to areas as units of coding, which partition each predetermined shape frame in the shape coded data; and a decoded shape value which is obtained by decoding the shape coded data.

12. The image coding method of claim 8, wherein in addition to the shape coded data, the predetermined shape information includes:

partition data for distinguishing partitions of stream parts corresponding to areas as units of coding, which partition each predetermined shape frame in the shape coded data;

data for distinguishing whether a coding process for a pixel value is to be performed to an area in a pixel frame corresponding to an area as a unit of coding in a predetermined shape frame; and a decoded shape value which is obtained by decoding the shape coded data.

13. The image coding method of claim 1, wherein when a size of the pixel frame is different from a size of a predetermined shape frame corresponding to the pixel frame, predetermined shape information having no corresponding pixel information is assumed to be information outside a coding target, which corresponds to an outside part of a shape on the predetermined shape frame and to which a coding process is not performed.

14. The image coding method of claim 3, wherein the shape coding process is carried out such that, when a size of the pixel frame is different from a size of a predetermined shape frame corresponding to the pixel frame, a shape size conversion process of converting the predetermined shape information so that the size of the predetermined shape frame matches the size of the corresponding pixel frame is carried out and coding of predetermined shape information having the converted size is carried out, the pixel coding process is carried out such that pixel information which forms a design of an area in the image, corresponding to the predetermined shape information having the converted size, is coded on the basis of the predetermined shape information having the converted size, and the multiplexing process is carried out such that coded data which include shape coded data obtained by coding of the predetermined shape information having the converted size and the pixel coded data obtained by the coding of the pixel information are generated.

15. The image coding method of claim 4, wherein the shape coding process is carried out such that, when a size of the pixel frame is different from a size of a predetermined shape frame corresponding to the pixel frame, a shape size conversion process of converting the predetermined shape information so that the size of the predetermined shape frame matches the size of the corresponding pixel frame is carried out and coding of predetermined shape information having the converted size is carried out, the pixel coding process is carried out such that pixel information which forms a design of an area in the image, corresponding to the predetermined shape information having the converted size, is coded on the basis of the predetermined shape information having the converted size, and the multiplexing process is carried out such that coded data which include shape coded data obtained by coding of the predetermined shape information having the converted size and the pixel coded data obtained by the coding of the pixel information are generated.

16. The image coding method of claim 1, wherein the pixel coding process is carried out such that, when a size of the pixel frame is different from a size of a predetermined shape frame corresponding to the pixel frame, a pixel size conversion process of converting pixel information corresponding to the pixel frame so that the size of the pixel frame matches the size of the corresponding predetermined shape frame is carried out and coding of the pixel information having the converted size in the image, which forms the design of the area corresponding to the prescribed shape is carried out on the basis of the predetermined shape information, and the multiplexing process is carried out such that coded data which include pixel coded data obtained by coding the pixel information having the converted size and shape coded data corresponding to the predetermined shape information are generated.

17. An image coding apparatus for coding pixel information which is included in an image signal of an image to be reproduced and forms a design of the image on a pixel frame, on the basis of shape information indicating an arbitrary shape on a shape frame, the image coding apparatus comprising:

a pixel encoder for coding pixel information which forms a design of an area in the image, corresponding to a prescribed shape on the basis of predetermined shape information used as the shape information, which has been previously generated independently of the pixel information included in the image signal and indicates the prescribed shape on a predetermined shape frame, and outputting pixel coded data; and a multiplexer for generating coded data which include the pixel coded data and shape coded data corresponding to the predetermined shape information.

18. A program stored on a data storage medium, the program for implementing an image coding process for coding pixel information which is included in an image signal of an image to be reproduced and forms a design of the image on a pixel frame, on the basis of shape information indicating an arbitrary shape on a shape frame, by a computer, said program being an image coding program for performing, by the computer:

a pixel coding process of coding pixel information, which forms a design of an area in the image, corresponding to a prescribed shape on the basis of predetermined shape information previously generated independently of pixel information used as the shape information, which is included in the image signal and indicates the prescribed shape; and a multiplexing process of generating coded data which include pixel coded data obtained by the coding of the pixel information and shape coded data corresponding to the prescribed shape information.

* * * * *

UNITED STATES PATENT AND TRADEMARK OFFICE
CERTIFICATE OF CORRECTION

PATENT NO. : 6,813,388 B2
DATED : November 2, 2004
INVENTOR(S) : Shinya Kadono

It is certified that error appears in the above-identified patent and that said Letters Patent is hereby corrected as shown below:

<u>Title page,</u>
Item [56], References Cited, FOREIGN PATENT DOCUMENTS, should read as follows: -- JP          11-055665 A          2/1999 --

<u>Column 33,</u>
Lines 29 and 38, please replace "wherein" with -- wherein, --.

<u>Column 34,</u>
Line 60, please replace "information which" to -- information, which --.

Signed and Sealed this

Twelfth Day of April, 2005

JON W. DUDAS
*Director of the United States Patent and Trademark Office*